US010696066B2

(12) United States Patent
 Miller

(10) Patent No.: US 10,696,066 B2
(45) Date of Patent: Jun. 30, 2020

(54) ADDITIVE COLOR PRINTING USING MULTIPLE COLOR GRAPHIC LAYERS

(71) Applicant: NIKE, Inc., Beaverton, OR (US)

(72) Inventor: Todd W. Miller, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 16/277,883

(22) Filed: Feb. 15, 2019

(65) Prior Publication Data

US 2019/0176484 A1    Jun. 13, 2019

Related U.S. Application Data

(63) Continuation of application No. 15/424,445, filed on Feb. 3, 2017, now Pat. No. 10,245,846.
(Continued)

(51) Int. Cl.
| | | |
|---|---|---|
| *B41J 3/00* | (2006.01) | |
| *B41J 3/407* | (2006.01) | |
| *B29C 64/112* | (2017.01) | |
| *A43D 95/14* | (2006.01) | |
| *A43B 23/02* | (2006.01) | |

(Continued)

(52) U.S. Cl.
CPC .............. *B41J 3/4078* (2013.01); *A41D 1/00* (2013.01); *A41D 31/02* (2013.01); *A43B 23/0235* (2013.01); *A43D 95/14* (2013.01); *B29C 64/106* (2017.08); *B29C 64/112* (2017.08); *B33Y 10/00* (2014.12); *B33Y 80/00* (2014.12); *B41J 2/21* (2013.01); *B41J 3/4073* (2013.01); *B41M 5/0047* (2013.01); *B41M 5/0064* (2013.01); *A43B 1/0072* (2013.01); *A43B 3/0078* (2013.01); *A43B 23/0215* (2013.01); *A43D 8/22* (2013.01); *B29K 2995/0021* (2013.01); *B29L 2031/48* (2013.01); *B29L 2031/504* (2013.01);
(Continued)

(58) Field of Classification Search
CPC ........ A41D 1/00; A41D 31/02; A43B 1/0072; A43B 3/0078; B33Y 80/00; B29L 2031/48
USPC ....................................... 428/195.1
See application file for complete search history.

(56) References Cited

U.S. PATENT DOCUMENTS

| | | |
|---|---|---|
| 5,468,532 A | 11/1995 | Ho et al. |
| 6,649,113 B1 | 11/2003 | Manners et al. |

(Continued)

FOREIGN PATENT DOCUMENTS

| | | |
|---|---|---|
| CN | 101356245 A | 1/2009 |
| CN | 105308237 B | 2/2016 |

(Continued)

OTHER PUBLICATIONS

International Search Report and Written Opinion, dated Jul. 18, 2017, for corresponding International Patent Application No. PCT/US2017/016460, 21 pages.

*Primary Examiner* — Betelhem Shewareged
(74) *Attorney, Agent, or Firm* — Klarquist Sparkman, LLP

(57) ABSTRACT

Methods and systems are provided for color printing. A three-dimensional object can be printed onto an article using the methods and systems. The three-dimensional object can include a lower color graphic layer printed onto an article, one or more transparent structural layers printed onto the lower color graphic layer, and an upper color graphic layer printed onto an uppermost layer of the one or more transparent structural layers. The upper color graphic layer and
(Continued)

the lower color graphic layer collectively visually depict a color graphic image.

24 Claims, 21 Drawing Sheets

Related U.S. Application Data

(60) Provisional application No. 62/291,884, filed on Feb. 5, 2016.

(51) Int. Cl.
| | | |
|---|---|---|
| *B41M 5/00* | (2006.01) | |
| *B33Y 80/00* | (2015.01) | |
| *B33Y 10/00* | (2015.01) | |
| *B29C 64/106* | (2017.01) | |
| *A41D 1/00* | (2018.01) | |
| *A41D 31/02* | (2019.01) | |
| *B41J 2/21* | (2006.01) | |
| *B29L 31/50* | (2006.01) | |
| *A43D 8/22* | (2006.01) | |
| *A43B 3/00* | (2006.01) | |
| *A43B 1/00* | (2006.01) | |
| *B29L 31/48* | (2006.01) | |

(52) U.S. Cl.
CPC .... *B29L 2031/505* (2013.01); *B41M 2205/38* (2013.01); *B41M 2205/42* (2013.01)

(56) References Cited

U.S. PATENT DOCUMENTS

| | | | |
|---|---|---|---|
| 8,049,138 | B2 | 11/2011 | Yamada et al. |
| 8,776,849 | B2 | 7/2014 | Colby |
| 8,848,233 | B2 | 9/2014 | Gullentops et al. |
| 9,242,496 | B2 | 1/2016 | Nakano et al. |
| 2009/0322804 | A1 | 12/2009 | Usuda et al. |
| 2010/0003472 | A1 | 1/2010 | Lien et al. |
| 2013/0025037 | A1* | 1/2013 | Turner ............... A41D 13/0593 2/455 |
| 2014/0026773 | A1* | 1/2014 | Miller ................. A43B 3/0078 101/485 |
| 2014/0115748 | A1 | 5/2014 | Berns et al. |
| 2015/0002567 | A1 | 1/2015 | Miller |
| 2015/0258770 | A1 | 9/2015 | Chan et al. |
| 2015/0268393 | A1 | 9/2015 | Liles et al. |
| 2019/0176484 | A1* | 6/2019 | Miller ....................... B41J 2/21 |

FOREIGN PATENT DOCUMENTS

| | | |
|---|---|---|
| JP | 2010-000788 A | 1/2010 |
| WO | WO 2007/033031 A2 | 3/2007 |
| WO | WO 2015/142587 A1 | 9/2015 |
| WO | WO 2015/161093 A1 | 10/2015 |

* cited by examiner

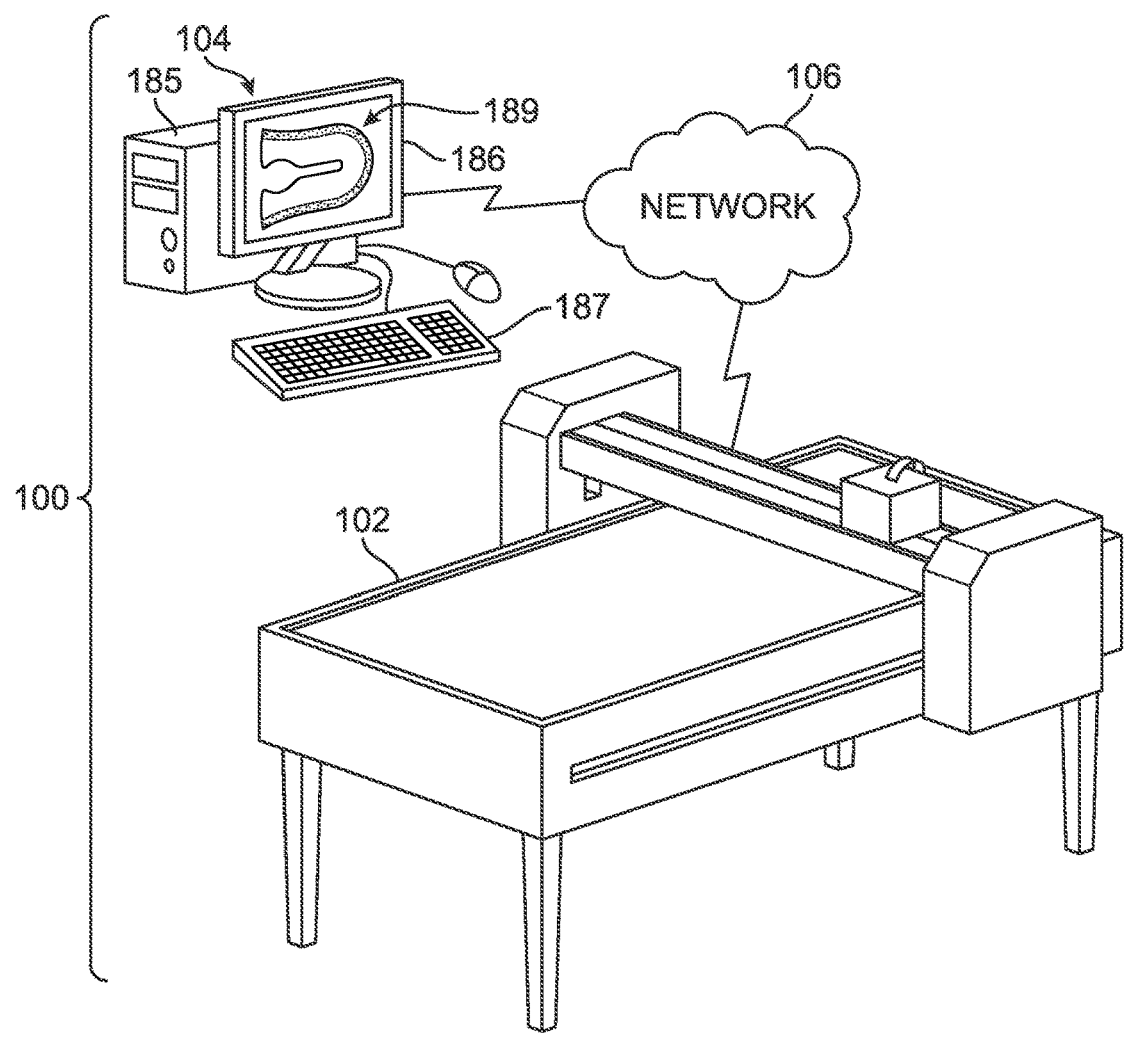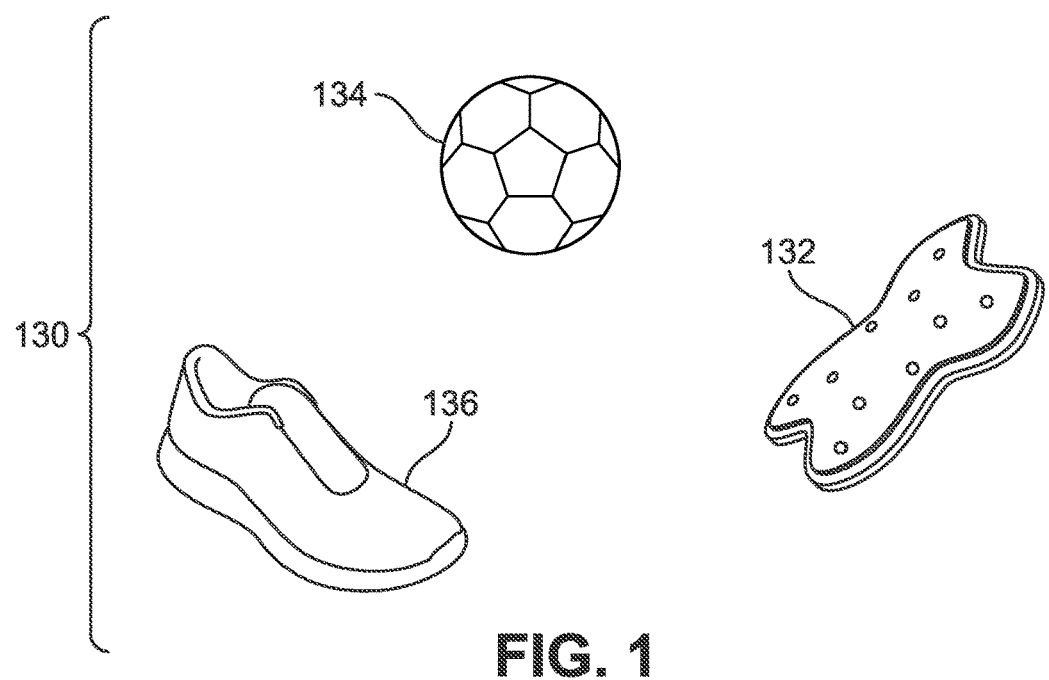
FIG. 1

ADDITIVE COLOR PRINTING USING MULTIPLE COLOR GRAPHIC LAYERS

CROSS REFERENCE TO RELATED APPLICATIONS

This application is a continuation of U.S. patent application Ser. No. 15/424,445 filed Feb. 3, 2017, which claims the benefit of U.S. Provisional Application No. 62/291,884 filed Feb. 5, 2016, both of which are incorporated by reference herein.

BACKGROUND

Embodiments relate generally to printing UV-curable graphic layers on substrates such as the fabric used to make articles of apparel such as shirts, shorts, pants, jackets, hats or caps, or to make uppers for articles of footwear, such as running, training, jogging, hiking, walking, volleyball, handball, tennis, lacrosse, basketball shoes, and other similar articles of footwear, as well as to make other articles such as backpacks or tents.

Articles of apparel may be made of a woven or non-woven fabric, or of a mesh material, or may be made of leather, synthetic leather or of plastic materials. Articles of apparel may have items such as emblems or logos on the sleeves, torso, pants leg, or other portions of the article of apparel. Articles of apparel may also have abrasion-resistant, water-resistant or protective layers at, for example, the elbows, the shoulders, and/or the knees.

Embodiments disclosed in this application may be fabricated using printers or plotters that may be programmed to deposit layers of acrylic resin ink, polyurethane ink, TPU ink or silicone ink or other inks on a fabric or other article. Such printers or plotters may be programmed to cover a two-dimensional portion of a fabric, for example, by moving a printhead along a track in a first direction and moving the track in a second direction that is orthogonal to the first direction. Other printers or plotters may move the printhead in a first direction while moving the printer platform in a second direction that is orthogonal to the first direction, or may move the platform in both directions while keeping the printhead stationary.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 1 shows a schematic diagram of a printing system, in accordance with an exemplary embodiment;

DETAILED DESCRIPTION

Figure 2:
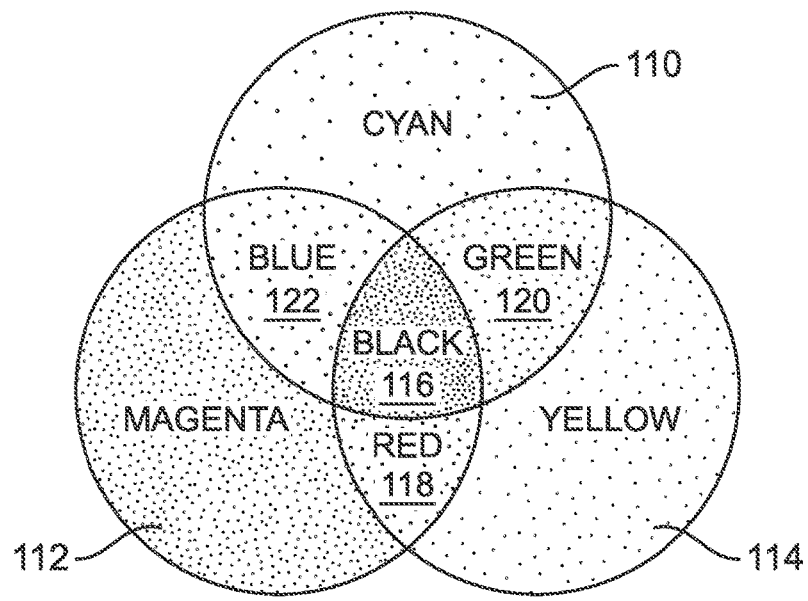
FIG. 2 shows a CMYK Venn diagram, in accordance with an exemplary embodiment.

For clarity, the detailed descriptions herein describe certain exemplary embodiments, but the disclosure in this application may be applied to any method for fabricating an article including any suitable combination of features described herein and recited in the claims. In particular, although the following detailed description describes certain exemplary embodiments, it should be understood that other embodiments may be used for the fabrication of other articles of footwear or apparel.

As used herein, the terms "printing device," "printer," "plotter," "3D printer," "three-dimensional printing system," or "3D printing system" may refer to any type of system that can print multiple layers onto a fabric, an article of footwear, an article of apparel or other article, including, for example, sign and graphics printers. The printers may use any appropriate type of UV-curable ink, including acrylic resin ink, polyurethane ink, TPU ink or silicone ink or any other appropriate ink.

The description uses the term "color graphic" or "color graphic image" to refer to any 2D or 3D graphical design. As discussed throughout this detailed description and in the claims two or more layers of printed material may collectively visually depict a particular color graphic image. That is, when superimposed and viewed from one or more particular angles, the two layers visually combine to show the color graphic image.

In one aspect, a method of printing a three-dimensional object onto a substrate using a printing device is provided. The method includes receiving color graphic design information at the printing device and receiving the substrate at the printing device. The color graphic design information represents a color graphic image, also referred to simply as a color graphic throughout this detailed description. The method further includes printing a lower color graphic layer of the three-dimensional object onto the substrate using the color graphic design information. The method further includes printing a transparent structural layer of the three-dimensional object onto the lower color graphic layer and printing an upper color graphic layer of the three-dimensional object onto the transparent structural layer using the color graphic design information. A combination of the upper color graphic layer and the lower color graphic layer visually matches the color graphic.

In another aspect, a method of printing a three-dimensional object onto a non-white substrate using a printing device is provided. The method includes receiving color graphic design information at the printing device and receiving the non-white substrate at the printing device. The color graphic design information represents a color graphic. The method further includes printing a white layer of the three-dimensional object onto the non-white substrate and printing a lower color graphic layer of the three-dimensional object onto the white layer using the color graphic design information. The method further includes printing a transparent structural layer of the three-dimensional object onto the lower color graphic layer and printing an upper color graphic layer of the three-dimensional object onto the transparent structural layer using the color graphic design information. A combination of the upper color graphic layer and the lower color graphic layer visually matches the color graphic.

In another aspect, a method of printing a three-dimensional object onto a substrate using a printing device is provided. The method includes receiving color graphic design information at the printing device and receiving the substrate at the printing device. The color graphic design information representing a color graphic. The method further includes printing a lower color graphic layer of the three-dimensional object onto the substrate using the color graphic design information. The method further includes printing an inner transparent structural layer of the three-dimensional object onto the lower color graphic layer and printing an intermediate color graphic layer of the three-dimensional object onto the inner transparent structural layer using the color graphic design information. The method further includes printing an outer transparent structural layer of the three-dimensional object onto the intermediate color graphic layer and printing an upper color graphic layer of the three-dimensional object onto the outer transparent structural layer using the color graphic design information. A combination of the upper color graphic layer, the intermediate color graphic layer, and the lower color graphic layer visually matches the color graphic.

In another aspect, a method of printing a three-dimensional object onto a non-white substrate using a printing device is provided. The method includes receiving color graphic design information at the printing device and receiving the non-white substrate at the printing device. The color graphic design information representing a color graphic. The method further includes printing a white layer of the three-dimensional object onto the non-white substrate and printing a lower color graphic layer of the three-dimensional object onto the white layer using the color graphic design information. The method further includes printing an inner transparent structural layer of the three-dimensional object onto the lower color graphic layer and printing an intermediate color graphic layer of the three-dimensional object onto the inner transparent structural layer using the color graphic design information. The method further includes printing an outer transparent structural layer of the three-dimensional object onto the intermediate color graphic layer and printing an upper color graphic layer of the three-dimensional object onto the outer transparent structural layer using the color graphic design information. A combination of the upper color graphic layer, the intermediate color graphic layer, and the lower color graphic layer visually matches the color graphic.

In another aspect, a method of printing a three-dimensional object onto a substrate using a printing device is provided. The method includes receiving color graphic design information at the printing device and receiving the substrate at the printing device. The color graphic design information representing a color graphic. The method further includes printing a transparent base layer of the three-dimensional object onto the substrate and printing a lower color graphic layer of the three-dimensional object onto the transparent base layer using the color graphic design information. The method further includes printing an inner transparent structural layer of the three-dimensional object onto the lower color graphic layer and printing an intermediate color graphic layer of the three-dimensional object onto the inner transparent structural layer using the color graphic design information. The method further includes printing an outer transparent structural layer of the three-dimensional object onto the intermediate color graphic layer and printing an upper color graphic layer of the three-dimensional object onto the outer transparent structural layer using the color graphic design information. A combination of the upper color graphic layer, the intermediate color graphic layer, and the lower color graphic layer visually matches the color graphic.

In another aspect, a method of printing a three-dimensional object onto a substrate using a printing device is provided. The method includes receiving color graphic design information at the printing device and receiving the substrate at the printing device. The color graphic design information includes a set of graphic information representing a color graphic. The method further includes printing a lower color graphic layer of the three-dimensional object onto the substrate using the set of graphic information. The lower color graphic layer visually matches the color graphic. The method further includes printing an inner opaque structural layer of the three-dimensional object onto the lower color graphic layer and printing an intermediate color graphic layer of the three-dimensional object onto the inner opaque structural layer using the set of graphic information. The intermediate color graphic layer visually matches the color graphic. The method further includes printing an outer opaque structural layer of the three-dimensional object onto the intermediate color graphic layer and printing an upper color graphic layer of the three-dimensional object onto the outer transparent structural layer using the set of graphic information. The upper color graphic layer visually matches the color graphic.

In another aspect, a method of printing a three-dimensional object onto a non-white substrate using a printing device is provided. The method includes receiving color graphic design information at the printing device and receiving the non-white substrate at the printing device. The color graphic design information includes a set of graphic information representing a color graphic. The method further includes printing a white layer of the three-dimensional object onto the non-white substrate and printing a lower color graphic layer of the three-dimensional object onto the white layer using the set of graphic information. The lower color graphic layer visually matches the color graphic. The method further includes printing an inner opaque structural layer of the three-dimensional object onto the lower color graphic layer and printing an intermediate color graphic layer of the three-dimensional object onto the inner opaque structural layer using the set of graphic information. The intermediate color graphic layer visually matches the color graphic. The method further includes printing an outer opaque structural layer of the three-dimensional object onto the intermediate color graphic layer and printing an upper color graphic layer of the three-dimensional object onto the outer transparent structural layer using the set of graphic information. The upper color graphic layer visually matches the color graphic.

In each of the aspects described above multiple structural layers could be used between each color graphic layer. For example, two or more inner structural layers (transparent or opaque) could be used between an inner graphic layer and an intermediate graphic layer. Likewise, two or more outer structural layers (transparent or opaque) could be used between an intermediate graphic layer and an outer graphic layer.

Other systems, methods, features, and advantages of the embodiments will be, or will become, apparent to one of ordinary skill in the art upon examination of the following figures and detailed description. It is intended that all such additional systems, methods, features, and advantages be included within this description and this summary be within the scope of the embodiments.

Although the drawings and the textual description herein only describe embodiments as they may be used on certain articles of footwear or certain articles of apparel, the descriptions herein may also be applied to other articles of footwear and/or to other articles of apparel, including, for example, articles of footwear such as running, training, jogging, hiking, walking, volleyball, handball, tennis, lacrosse, basketball shoes and other similar articles of footwear, or articles of apparel such as shorts, shirts, jerseys, jackets, pants, gloves, wrist bands, head bands, arm bands, hats or caps, as well as to other articles such a backpacks or tents.

FIG. 1 is a schematic view of an embodiment of three-dimensional printing system 100, also referred to simply as printing system 100. Some embodiments of the printing system can include provisions that distribute one or more functions among different devices of the printing system. As shown, printing system 100 may include printing device 102, computing system 104, and network 106. In other embodiments, the printing system may be a single device or component (not shown).

Some embodiments of the printing device can include provisions that permit color printing. In some embodiments, the printing system may use CMYK printing. In other embodiments, the color printing may be conducted using another suitable printing method.

In embodiments where color printing is conducted using CMYK printing, any suitable device, protocol, standard, and method may be used to facilitate the color printing. As used herein, "CMYK" may refer to four pigments used in color printing: "C" for a cyan pigment, "M" for a magenta pigment, "Y" for a yellow pigment, and "K" for a key pigment. In some cases, the key pigment may be a black pigment. An example of a printing device using CMYK printing is disclosed in Miller, U.S. Patent Publication Number 2015-0002567, published on Jan. 1, 2015, titled "Additive Color Printing" (U.S. patent application Ser. Number 13/927,551, filed on Jun. 26, 2013), which application is herein incorporated by reference and referred to hereafter as the "Color Printing" application. In some embodiments, printing system 100 can include one or more features of the systems, components, devices, and methods disclosed in the Color Printing application to facilitate color printing. For example, the printing device may be configured to print an image by dispensing droplets of a print material including one or more pigments onto a substrate. As used herein, droplets may refer to any suitable volume of print material. For example, a droplet may be one milliliter of print material. In other embodiments, the printing system may use other systems, components, devices, and methods.

In embodiments where the printing system includes provisions that distribute one or more functions among different devices of the printing system, any suitable division may be used. In some embodiments, printing system 100 can include provisions that control and/or receive information from printing device 102. These provisions can include computing system 104 and network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some embodiments, a print server may be primarily responsible for controlling and/or communicating with printing device 102, while a separate computer (e.g., desktop, laptop, or tablet) may facilitate interactions with a user. Computing system 104 can also include one or more storage devices including, but not limited to, magnetic, optical, magneto-optical, and/or memory, including volatile memory and non-volatile memory.

In some embodiments, any suitable hardware or hardware systems may be used to facilitate provisions that control and/or receive information from printing device 102. In some embodiments, where a computing system is used, computing system 104 may include central processing device 185, viewing interface 186 (e.g., a monitor or screen), input devices 187 (e.g., keyboard and mouse), and software for creating color graphic design information 189 for printing a three-dimensional object. As used herein, color graphic design information may include any suitable information to facilitate formation of a three-dimensional object to have an appearance identical to a color graphic represented by the color graphic design information. Examples of a color graphic may include logos, trademarks, customized images, names, and the like. In some instances, the color graphic may be a personalized finishing for a particular customer. In other embodiments, other forms of hardware systems may be used.

Generally, any suitable information may be used to facilitate provisions for software for designing a color graphic design for a three-dimensional object. In at least some embodiments, software for designing a color graphic design of a printed structure may include not only information about the geometry of the structure but also information related to the materials required to print various portions of the structure. In other embodiments, different information may be used.

Generally any suitable design structure may be used to transform the design into information that can be interpreted by printing device 102 (or a related print server in communication with printing device 102). In some embodiments, printing system 100 may be operated as follows to provide one or more structures that have been formed using a three-dimensional printing, or additive process. Computing system 104 may be used to design a structure. This may be accomplished using some type of CAD software or other kind of software. The design may then be transformed into information that can be interpreted by printing device 102 (or a related print server in communication with printing device 102). In some embodiments, the design may be converted to a three-dimensional printable file, such as a stereolithography file (STL file); in other cases, the design may be converted into a different design structure.

In some embodiments where the printing system includes provisions that distribute one or more functions among different devices of printing system 100, any suitable protocol, format, and method may be used to facilitate communication among the devices of printing system 100. In some embodiments, these communications are conducted using network 106. In other cases, these communications may be conducted directly between devices of printing system 100.

In some embodiments, the network may use any wired or wireless provisions that facilitate the exchange of information between computing system 104 and printing device 102. In some embodiments, network 106 may further include various components such as network interface controllers, repeaters, hubs, bridges, switches, routers, modems, and firewalls. In some embodiments, network 106 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

Some embodiments of the printing system can include provisions that permit printed structures to be printed directly onto one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots. As used herein, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of articles of footwear, various embodiments may further be equally applied to any article of clothing, apparel, or equipment that includes three-dimensional printing. For example, various embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used herein, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

Referring to FIG. 1, which shows an embodiment including set of articles 130, in other embodiments, different articles may be used. As shown, set of articles 130 includes article of footwear 136, soccer ball 134, and shin guard 132. In other embodiments, set of articles 130 may be different.

Generally any suitable surface of the article may be used as a substrate to receive the three-dimensional objects. In some embodiments, the article includes a surface in a flattened configuration. Referring to FIG. 1, shin guard 132 may have a front surface and/or a back surface in a flattened configuration. In other embodiments, an article may include a surface having a three-dimensional configuration. For example, a side surface of article of footwear 136 may have a three-dimensional configuration. In another example, a top surface of soccer ball 134 may have a three-dimensional configuration. In other embodiments, the printing device and/or printing system may print onto other surfaces.

Some embodiments of the printing system can include provisions that permit printing directly onto the article. In other cases, the three-dimensional object is first printed onto a release layer and then transferred onto the article.

In some embodiments any suitable material may be used to form the article to facilitate use of the article. In some embodiments, printing device 102 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a substrate and the bottom of the print material, and without the need for a perfectly or near perfectly flat substrate surface on which to print.

In some embodiments, the articles may be customizable. As used herein, a customizable article may be preprocessed and unfinished. Referring to FIG. 1, processing of article of footwear 136 may include cutting an upper in a particular shape and/or treating the upper to improve durability for use as footwear. In some examples, the upper may be folded and attached to a sole. In other examples, the upper may be in a flat configuration (see FIG. 5). In the example of FIG. 1, article of footwear 136 may not be finished with a mass production design. Instead, article of footwear 136 may have a white or gray color that may be suitable for finishing with a personalized style for a particular customer.

In those instances where CMYK printing is used, CMYK may produce or approximate any color in the visible spectrum by printing and intermixing various combinations of pigments, as exemplified by the CMYK Venn diagram shown in FIG. 2. Referring to FIG. 2, pigments for the colors cyan 110, magenta 112, and yellow 114 may be intermixed to produce one or more colors of red 118, green 120, and blue 122 as shown. Further intermixing of pigments may be used to produce many more colors beyond red 118, green 120, and blue 122, cyan 110, magenta 112, and yellow 114.

As indicated above, some embodiments of CMYK printing can include provisions that permit intermixing of two or more pigments. In some embodiments, two or more pigments may be intermixed before dispensing. For example, a pigment for yellow 114 and a pigment for cyan 110 may be mixed to form green 120. In the example, the pigments for green 120 may be premixed and stored in a cartridge for printing. In other cases, two or more pigments may be intermixed during printing. For example, the pigment for yellow 114 and the pigment for cyan 110 may be dispensed directly onto a substrate and intermix on the substrate to form green 120. In other embodiments, other intermixing of two or more pigments may be used.

Some embodiments of CMYK may print black by intermixing pigments for cyan, magenta, and yellow. Referring to FIG. 2, pigments for cyan 110, magenta 112, and yellow 114 may be intermixed to produce black 116. In some embodiments, black produced by intermixing pigments for cyan, magenta, and yellow may appear visually to an observer as a lighter black instead of a very dark or saturated black. So, in those instances where black produced by intermixing appears visually to an observer as a lighter black, a CMYK printing device may also include a separate cartridge or reservoir for having premixed pigments for producing black 116.

In some embodiments, CMYK print material may be considered subtractive in nature, in that they may reduce the whiteness of an underlying white base when viewed by reflected visible light by masking it with one or more layers of printed CMYK print material. In other embodiments, CMYK print material may include a white that may enhance the whiteness of an underlying white base when viewed by reflected visible light.

In some embodiments, any suitable print material may be used to facilitate color printing. In some embodiments, CMYK print materials may be water based. In other embodiments, CMYK print materials may be oil based. In some embodiments, CMYK print material may include a structural print material. In other embodiments, CMYK print material may include only pigments.

In embodiments where a CMYK print material includes a structural print material, the structural material may have any suitable property. In some embodiments, CMYK print materials may include a clear and/or transparent structural print material. In some embodiments, CMYK print materials may include an opaque structural print material. In some embodiments, the CMYK print material may include a translucent structural print material. In other embodiments, the structural material may have a combination of transparent structural material and/or translucent structural material.

Figure 3:
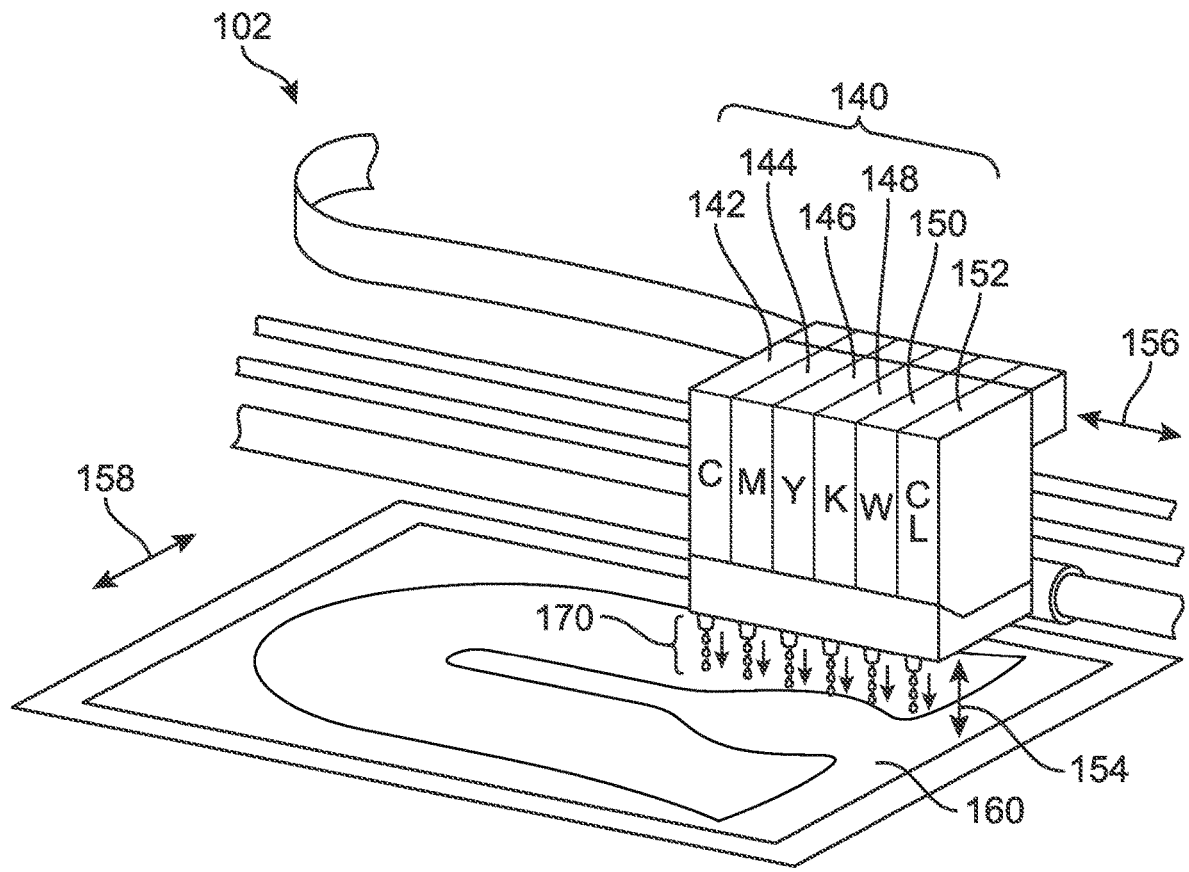
FIG. 3 shows a perspective view of a portion of a printing device having CMYK printing capabilities, in accordance with an exemplary embodiment.

Referring to FIG. 3, which shows an embodiment of CMYK printing, printing device 102 is shown to include printhead assembly 140. The printhead assembly may include any number of cartridges. In some embodiments, printhead assembly 140 may include cartridge 142 having cyan print material, cartridge 144 having magenta print material, cartridge 146 having yellow print material, cartridge 148 having key ("K") or black print material, cartridge 150 having white ("W") print material, and cartridge 152 having clear ("CL") print material. In other embodiments, the printhead assembly may use other cartridges. While one cartridge for each material is depicted in FIG. 3, consistent with some embodiments, printing device 102 may contain more than one cartridge for one or more of the print materials of printhead assembly 140. That is, printing device 102 may include a second clear cartridge (not shown). In other embodiments, printing device 102 may include other cartridges.

Some embodiments of the printing device can include provisions that permit any suitable color to be clear and/or transparent. In some embodiments, colors in the visible spectrum may include clear and/or transparent print material. Referring to FIG. 3, the cyan print material contained in cartridge 142 may include clear and/or transparent structural print material. In the example, the magenta print material contained in cartridge 144 may include clear and/or transparent structural print material. In the example, the yellow print material contained in cartridge 146 may include clear and/or transparent structural print material. In other embodiments, fewer and/or additional colors may include clear and/or transparent structural print material.

Some embodiments of the printing device can include provisions that permit any suitable color to be opaque. In some embodiments, the print material used to print colors in the visible spectrum may include opaque structural print material. Referring to FIG. 3, the white print material contained in cartridge 150 may include opaque structural print material. In the example, the key print material contained in cartridge 148 may include opaque structural print material. In such instances, the print material may include any suitable pigment, for example, a transparent pigment, an opaque pigment, a translucent pigment, and the like. In some embodiments, colors in the visible spectrum may be printed using one or more pigments that are opaque. Referring to FIG. 3, the white print material contained in cartridge 150 may include an opaque white pigment. In the example, the key print material contained in cartridge 148 may include an opaque key pigment and/or an opaque black pigment. In such instances, the print material may include any suitable structural print material, for example, a transparent structural print material, an opaque structural print material, a translucent structural print material, and the like. In other embodiments, other provisions may permit a color to be opaque.

Some embodiments of the printing device can include provisions that permit intermixing of two or more pigments. In some embodiments, the printing device may intermix two or more pigments during printing. Referring to FIG. 3, printing device 102 may dispense droplets 170 containing yellow print material from cartridge 146 and cyan print material from cartridge 142 directly onto substrate 160. In the example, droplets 170 may intermix on substrate 160 to form green print material. In other cases, printing device 102 may intermix two or more pigments before dispensing. For example, a pigment of yellow print material and a pigment of cyan print material may be intermixed to form a green print material (not shown). In the example, the green print material may be premixed and stored in a cartridge of printhead assembly 140 for printing (not shown). Other embodiments may omit provisions that permit intermixing of two or more pigments.

Some embodiments of the printing device may include provisions that permit the printhead assembly to be moved across the substrate to facilitate printing of features, such as images, graphics, designs, and text onto the substrate. In some embodiments, the printing device may move the printhead assembly along the substrate. In other embodiments, the printing device may move the substrate in relation to the printhead assembly.

In embodiments where the printing device moves the printhead assembly, the printing device may move the printhead assembly in a direction parallel to any suitable number of axes. In some embodiments, the printing device may move the printhead assembly along a printing surface. Referring to FIG. 3, printing device 102 may move printhead assembly 140 along substrate 160 to facilitate a printing onto substrate 160. In the example, printing device 102 may move printhead assembly 140 parallel to first axis 156 and/or parallel to second axis 158. As shown, first axis 156 may extend parallel to substrate 160 and/or perpendicular to second axis 158. In the example, second axis 158 may extend parallel to substrate 160 and/or perpendicular to first axis 156. In some embodiments, the printing device may raise or lower the printhead assembly. Referring to FIG. 3, printing device 102 may raise or lower printhead assembly 140 along third axis 154. As shown, third axis 154 may be normal to substrate 160 and perpendicular to first axis 156 and/or second axis 158. In other embodiments, the printing device may move the printhead assembly relative to the substrate differently.

In embodiments where the printing device moves the substrate, the printing device may move the substrate in a direction parallel to any suitable number of axes. In some embodiments, the printing device may move the substrate horizontally with the printhead assembly. Referring to FIG. 3, printing device 102 may move substrate 160 parallel to first axis 156 and/or parallel to second axis 158. In some embodiments, the printing device may move the substrate vertically with the printhead assembly. Referring to FIG. 3, printing device 102 may raise or lower substrate 160 relative to printhead assembly 140 in a direction parallel with third axis 154. In other embodiments, the printing device may move the substrate relative to the printhead assembly differently.

Figure 4:
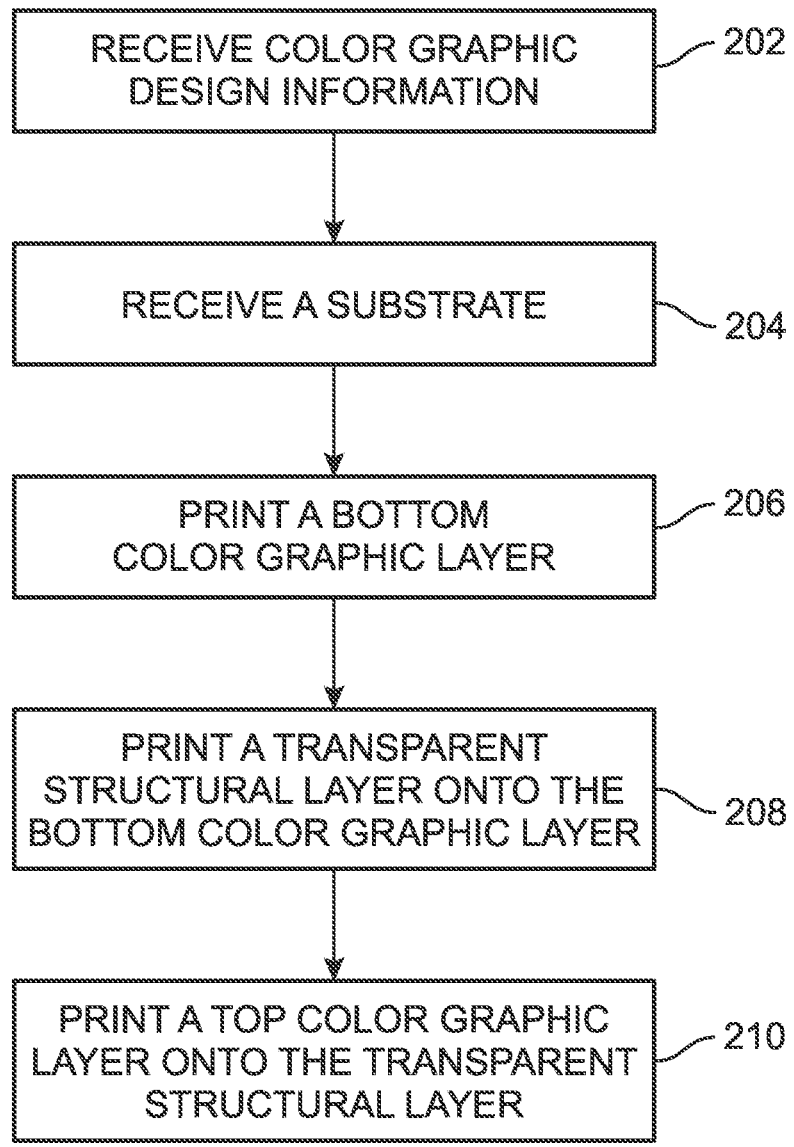
FIG. 4 shows a block diagram of a process for printing a three-dimensional object having multiple graphic layers, in accordance with an exemplary embodiment.

FIG. 4 shows a block diagram of a process for printing a three-dimensional object onto a substrate, in accordance with an exemplary embodiment. The various steps of FIG. 4 may be discussed with respect to FIGS. 5-12. In some embodiments, the steps of FIG. 4 use CMYK printing. In other cases, other methods, techniques, and/or processes may be used. In some embodiments, the steps of FIG. 4 may be implemented using the system illustrated in FIG. 1. In other cases, other systems and/or devices may be used. It should be understood that additional and/or fewer steps may be used. The processes illustrated in FIGS. 5-12 are for illustrative purposes only.

Figure 5:
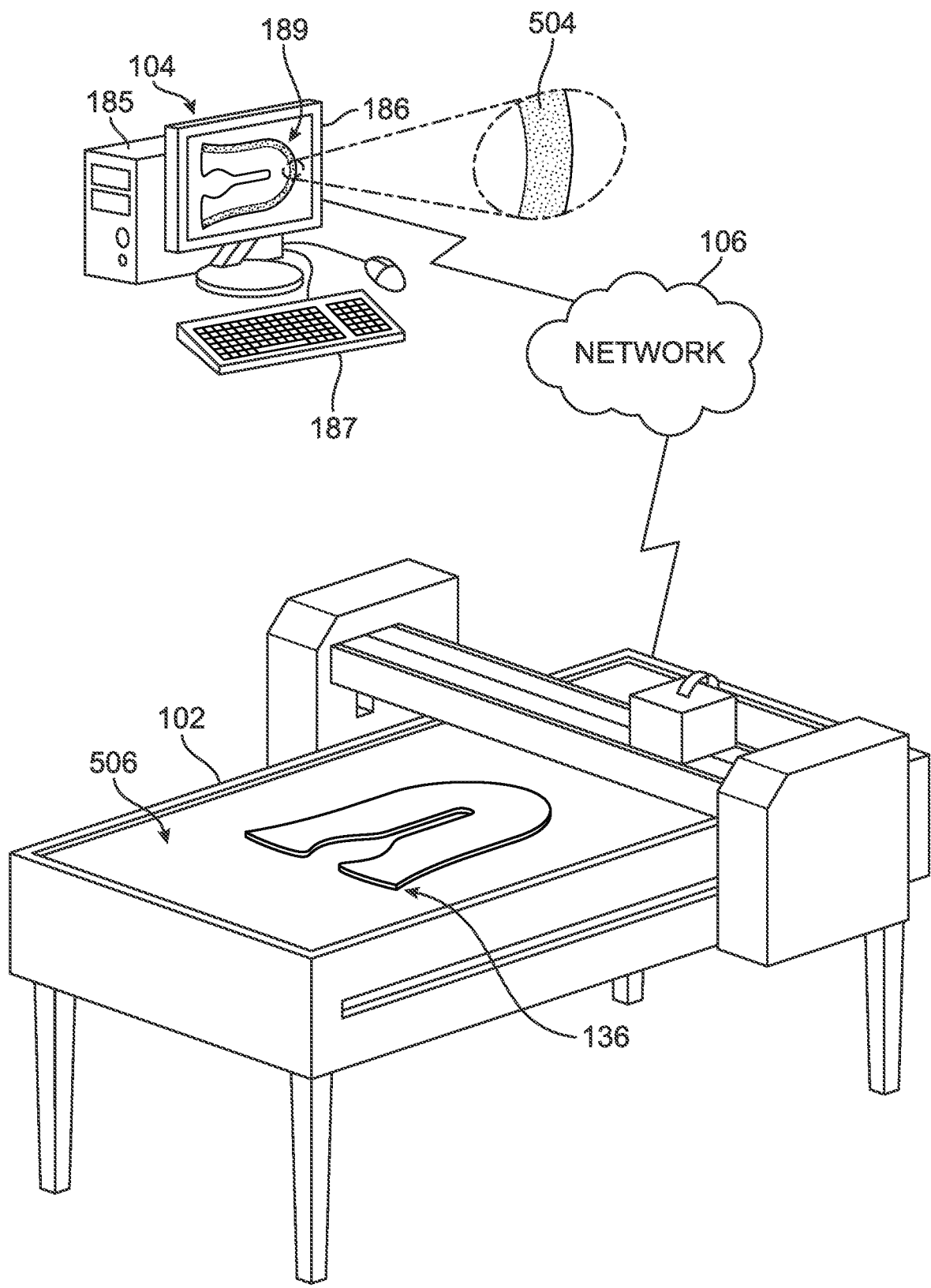
FIG. 5 shows a schematic diagram of the printing system of FIG. 1 receiving a substrate and receiving a color graphic design, in accordance with an exemplary embodiment.

In some embodiments, color graphic design information may be received, as in step 202, by a printing device. As used herein, color graphic design information may refer to any suitable information to facilitate printing a three-dimensional object to be visually identical to a color graphic. Such information may include one or more sets of graphic information as described further below. In some embodiments, the color graphic design information may be provided by a human user. Referring to FIG. 5, a human user, such as a customer or designer, may generate color graphic design information 189 according to personal preferences using computing system 104. It should be understood that in some embodiments, at least a portion of the color graphic design information may be automatically generated by a computing device. In the example, computing system 104 may transmit color graphic design information 189 using printing device 102, which may be locally connected to computing system 104 or may be remotely connected to computing system 104 using network 106. In other embodiments, the color graphic design information may be received differently by the printing device.

Generally, the color graphic design information may include any suitable number of sets of graphic information to represent a color graphic. As used herein, a set of graphic information may refer to any suitable image that by itself and/or in combination with one or more other sets of graphic information is visually identical to the color graphic represented by color graphic design information. In some embodiments, the color graphic design information may include a single set of graphic information for representing a color graphic. Referring to FIG. 5, a color graphic included in color graphic design information 189 may be represented by a single set of graphic information, such as a single image and/or single image file. In some embodiments, the color graphic design information may include multiple sets of graphic information. For example, a first set of graphic information included in color graphic design information 189 may represent a first portion of a color graphic. In the example, a second set of graphic information included in color graphic design information 189 may represent a second portion of the color graphic. In the example, a third set of graphic information included in color graphic design information 189 may represent a third portion of the color graphic included in color graphic design information 189. In other embodiments, the color graphic design may include a different number of sets of graphic information.

Generally, the color graphic design information may use any suitable format, protocol, and/or topology. In some embodiments, a set of graphic information of the color graphic design information may be a digital image or image file. For example, a set of graphic information may be an image file using a raster format, vector format, compound format, and/or stereo format. Examples of raster formats may include joint photographic experts group (JPEG), tagged image file format (TIFF), graphics interchange format (GIF), bitmap image file (BMP), portable networks graphics (PNG), and the like. Examples of vector formats may include computer graphics metafile (CGM), Gerber format (GERBER), scalable vector graphics (SVG), and the like. Examples of compound formats may include portable document format (PDF), encapsulated PostScript, PostScript, and the like. Examples of stereo format may include JPEG stereo (JPS), portable networks graphics (PSN), and the like. It should be understood that some image files may support multiple layers such that multiple sets of graphic information may be stored in a single image file. In other embodiments, the color graphic design may be different.

In some embodiments, the color graphic design information may indicate a target color composition of one or more pigments. As used herein, a target color composition may refer to a volume of print material for each color of CMYK printing. For example, a target color composition may include 20 droplets of cyan print material, 20 droplets of magenta print material, 20 droplets of yellow print material, 20 droplets of key print material, 20 droplets of clear print material, and/or 20 droplets of white print material. In other embodiments, the color graphic design may indicate a target color composition differently.

In some embodiments, the color graphic design information may include a target color for each pixel of a set of graphic information. For example, a set of graphic information may include a first pixel having a green target color and a second pixel having a red target color. In other embodiments, the color graphic design may be different.

In some embodiments, the target color of a pixel of a set of graphic information may indicate a target color composition of a corresponding region of a substrate. For example, a first pixel having a green target color may be printed using 20 droplets of cyan print material and 20 droplets of yellow print material to form a green region of a substrate, and a second pixel having a red target color may be printed using 20 droplets of cyan print material and 20 droplets of magenta print material to form a red region of the substrate. In other embodiments, the target color composition of each region of a substrate may be determined differently.

For exemplary purposes only, various embodiments depict the target color composition as a combination of cyan pigment and yellow pigment that results in a green color. Accordingly, it should be understood that the target color may be any suitable color and the target color composition may be any suitable combination of pigments. For example, the target color composition may be any one of the various combinations of print material exemplified by the CMYK Venn diagram shown in FIG. 2.

In some embodiments, the printing device may receive, as in step 204 (see FIG. 4), a substrate for printing a three-dimensional object. In some embodiments, the printing device may receive the substrate manually. Referring to FIG. 5, a human user may place article of footwear 136 onto platform 506 of printing device 102 to permit printing device 102 to print directly onto article of footwear 136. In other embodiments, the printing device may receive the substrate automatically. For example, the placement of article of footwear 136 onto printing device 102 may be automated using one or more loaders (not shown) to place article of footwear 136 (or another substrate) onto printing device 102.

Some embodiments can include provisions that permit a substrate to be processed to facilitate printing on the substrate. In some embodiments, processing the substrate may include shaping. In some embodiments, processing the substrate may include treating or finishing an exposed surface of an article. In some embodiments, processing a substrate may include using CMYK printing to prepare a substrate to receive a three-dimensional object. In other embodiments, a processing of the substrate may be omitted.

In embodiments where processing a substrate may include using CMYK printing to prepare a substrate to receive a three-dimensional object, any suitable CMYK printing may be used to prepare a substrate to receive the three-dimensional object. In some embodiments, CMYK printing to prepare a substrate to receive a three-dimensional object may include printing a base layer to form a planar print surface. For example, the printing device may use CMYK printing to form an optional base layer having a planar surface for receiving a three-dimensional object (not shown). In other embodiments, CMYK printing may be used to process the substrate differently to prepare a substrate to receive a three-dimensional object.

In those embodiments where CMYK printing is used to print an optional base layer to form a planar print surface, the base layer may be formed of any suitable materials. In some embodiments, an optional base layer may be formed using clear print material. In some embodiments, an optional base layer may be formed using white print material. In other embodiments, other print material may be used to form the base layer.

In some embodiments, the printing device may print, as in step 206 (see FIG. 4), a lower color graphic layer. For example, the lower color graphic layer may be formed using CMYK printing techniques as discussed above and/or using cyan print material, magenta print material, yellow print material, key print material, clear print material, white print material, and/or combinations thereof as discussed above. In other embodiments, other materials and/or techniques may be used to form the lower color graphic layer.

In some embodiments, a set of graphic information representing at least a portion of a color graphic may be used to facilitate a selection of print material for printing the lower color graphic layer. In some embodiments, the set of graphic information may have a same set of pigments as the color graphic (see FIG. 12). For example, a first set of graphic information may include a lighter green that when combined with a lighter green of a second set of graphic information may result in a dark green target color of the color graphic. In other embodiments, the set of graphic information may include a first subset or portion of pigments of the color graphic (see FIG. 20) and another set of graphic information may include a second subset of portion of pigments of the color graphic. In other embodiments, the set of graphic information may be omitted.

Figure 6:
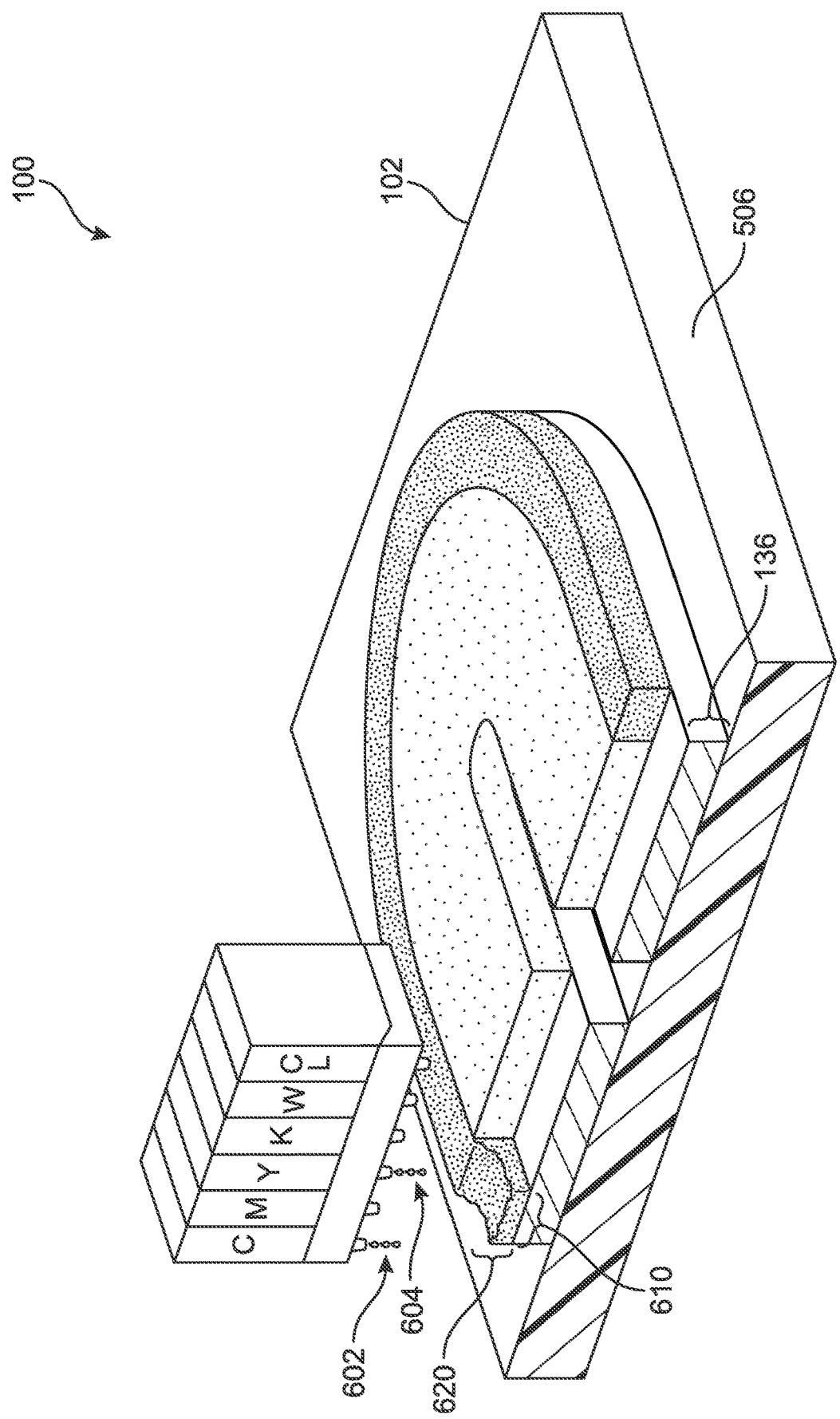
FIG. 6 shows a schematic view of dispensing a first print material onto a substrate to form a lower color graphic layer, in accordance with an exemplary embodiment.

In some embodiments, a region of the lower color graphic layer may be mapped to a pixel of the set of graphic information. Referring to FIGS. 5-6, printing system 100 may assign pixel 504 of color graphic design information 189 to first region 610 of lower color graphic layer 620. It should be understood that the pixel may be any suitable size and shape, and that the pixel may have any suitable ratio (e.g., 1-1, 2-1, 1-2,) with the region. In other embodiments, the lower color graphic layer may be printed using the color graphic design information differently.

In some embodiments, the lower color graphic layer may be printed using the set of graphic information. In such cases, the printing system may select print material to be visually equivalent or identical to a color assigned to a pixel of the set of graphic information. Referring to FIG. 6, printing system 100 may select cyan print material 602 and yellow print material 604 such that a combination of pigments is visually equivalent to a color assigned to pixel 504 (see FIG. 5). That is, for example, printing system 100 may include cyan print material 602 and yellow print material 604 such that the combination of print material may be visually equivalent to the target color composition for a green assigned to pixel 504. In other embodiments, the print material for a region may be selected differently.

Some embodiments can include provisions that permit dispensing of print material from multiple cartridges of the printhead assembly to permit printing of the lower color graphic layer. In other embodiments, print material may be dispensed from a single cartridge of the printhead assembly.

In embodiments where print material may be dispensed from multiple cartridges of the printhead assembly, any suitable combination of print material may be used to permit printing of the lower color graphic layer. Referring to FIG. 6, first region 610 of lower color graphic layer 620 may be formed from cyan print material 602 and yellow print material 604. In other embodiments, first region 610 may include other combinations of print material.

Some embodiments can include provisions that permit intermixing of print material dispensed from multiple cartridges of the printhead assembly. In some embodiments, the print material may be intermixed above the substrate. Referring to FIG. 6, cyan print material 602 and yellow print material 604 may intermix before contacting first region 610 of article of footwear 136. In some embodiments, the print material may be intermixed on the substrate. Referring to FIG. 6, cyan print material 602 and yellow print material 604 may intermix on first region 610 of article of footwear 136. In other embodiments, one or more combinations of CMYK print material may be premixed and dispensed from a single cartridge (not shown).

Some embodiments can include provisions that permit any suitable print material to be dispensed from the printhead assembly. In some embodiments, the print material may be light curable. Referring to FIG. 6, cyan print material 602 and/or yellow print material 604 may be light curable. In the example, printing device 102 may dispense cyan print material 602 and/or yellow print material 604 in a liquid form onto first region 610 of article of footwear 136. In some embodiments, the print material may be ultraviolet light curable. Referring to FIG. 6, cyan print material 602 and/or yellow print material 604 may be ultraviolet light curable. In other embodiments, the print material may be different. For example, the print material may include a thermoplastic.

In embodiments where print material dispensed from a printhead assembly is ultraviolet curable, any suitable method may be used to cure the print material. In some embodiments, a printing system may be provisioned to include a cure lamp. In other embodiments, a printing system may be provisioned to include other devices configured to cure an ultraviolet curable print material.

Figure 7:
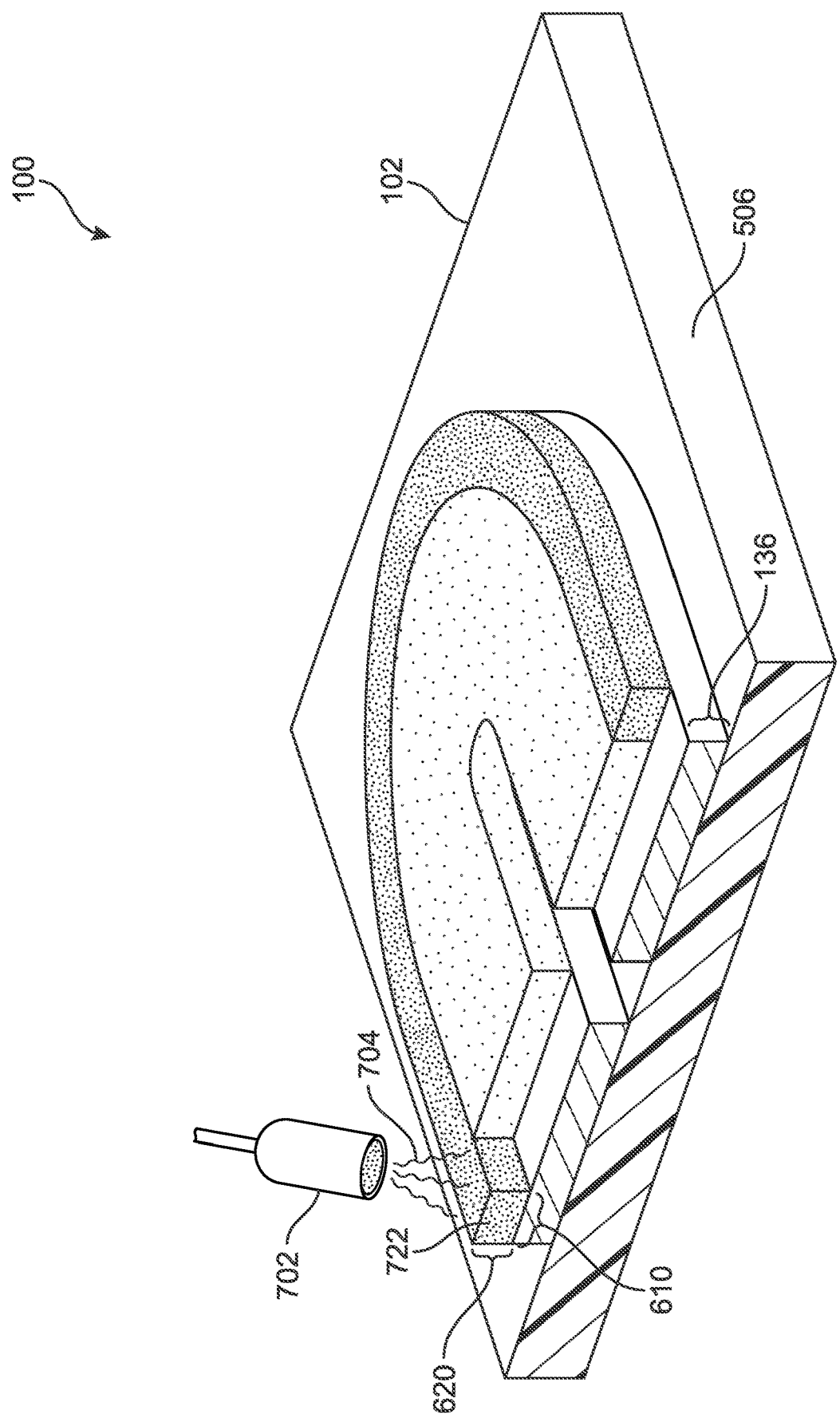
FIG. 7 shows a schematic view of curing the first print material of FIG. 6 on the substrate to form the lower color graphic layer, in accordance with an exemplary embodiment.

In embodiments where a printing system may be provisioned to include a curing device and to use light curable print material, the curing device may emit any suitable light to cure the print material. In some embodiments, the curing device emits ultraviolet light. Referring to FIG. 7, curing device 702 emits ultraviolet light 704 toward first region 610 of article of footwear 136 to cure first portion 722 of lower color graphic layer 620. In other embodiments, other print material may be used and/or the curing device may be omitted.

In some embodiments, the curing device may be provisioned to cure print material to transition any amount of the print material from a liquid state to a solid state. In some embodiments, the curing device may be provisioned to cure all print material dispensed onto a region of a substrate to transition the print material from a liquid state to a solid state. In other embodiments, the curing device may be provisioned to cure only a portion of a print material dispensed onto a region of a substrate to transition the print material from a liquid state to a solid state.

In embodiments where a printing system may be provisioned to intermix print material, a curing device may cure the print material at any suitable time. In some embodiments, the curing device cures the print material after the print material intermixes. Referring to FIGS. 6-7, curing device 702 may cure cyan print material 602 and/or yellow print material 604 after cyan print material 602 intermixes. In some embodiments, the curing device cures the print material after reshaping the substrate (not shown). In other embodiments, the curing device cures the print material at other times.

Figure 8:
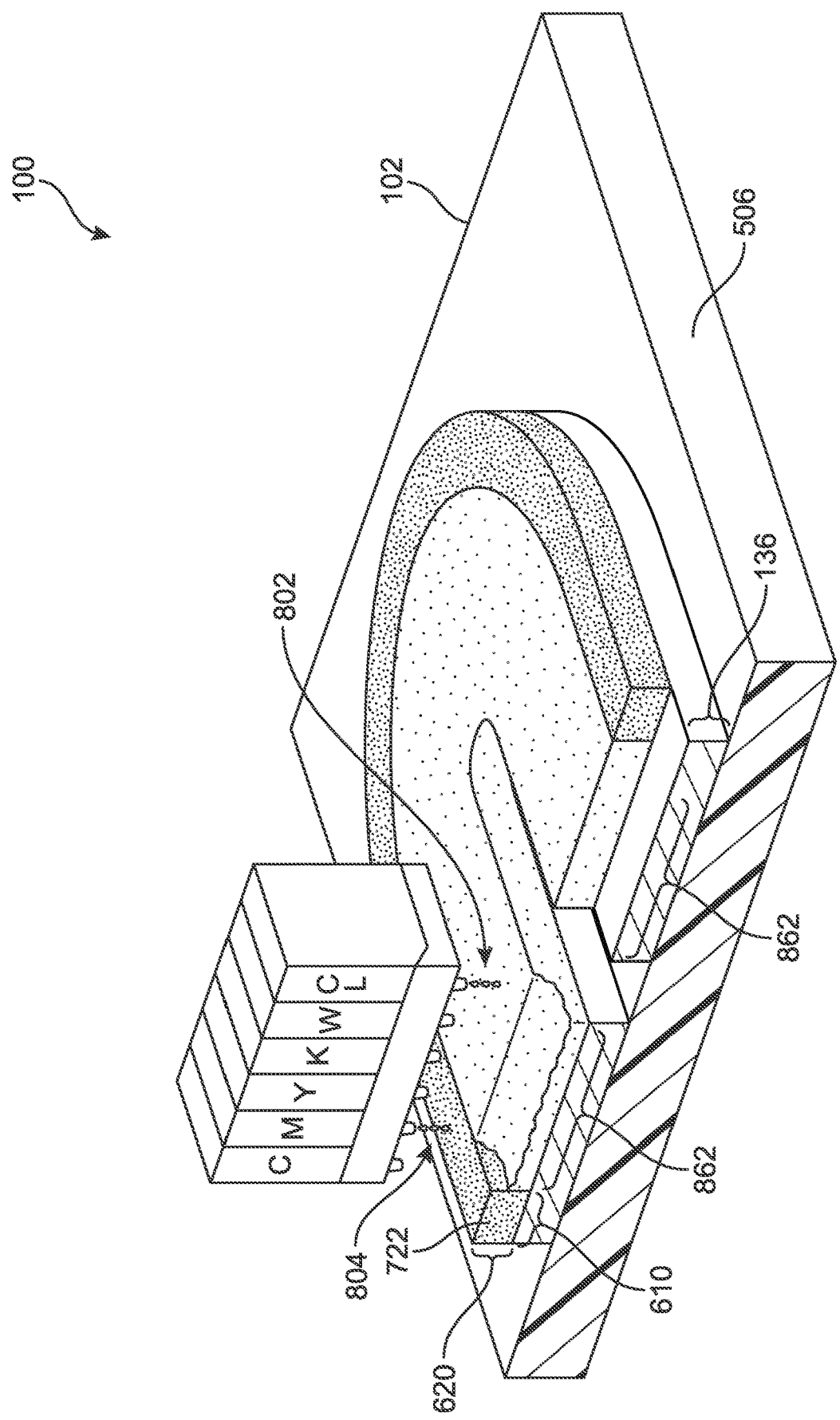
FIG. 8 shows a schematic view of dispensing a second print material onto the substrate of FIG. 6 to form the lower color graphic layer, in accordance with an exemplary embodiment.

In some embodiments, different portions of a color graphic layer may have different compositions of print material. Referring to FIG. 8, lower color graphic layer 620 may include first portion 722 formed by dispensing and curing cyan print material 602 and yellow print material 604 (see FIG. 6) in first region 610. In the example and referring to FIGS. 8-9, lower color graphic layer 620 may also include second portion 924 formed by dispensing and curing clear print material 802 and magenta print material 804 in second region 862. It should be understood that the use of magenta print material is exemplary only and that any suitable color or no color (e.g., clear) may be used to form the second portion of the lower color graphic layer. In other embodiments, different portions of the color graphic layer may be formed of equivalent print material.

Figure 9:
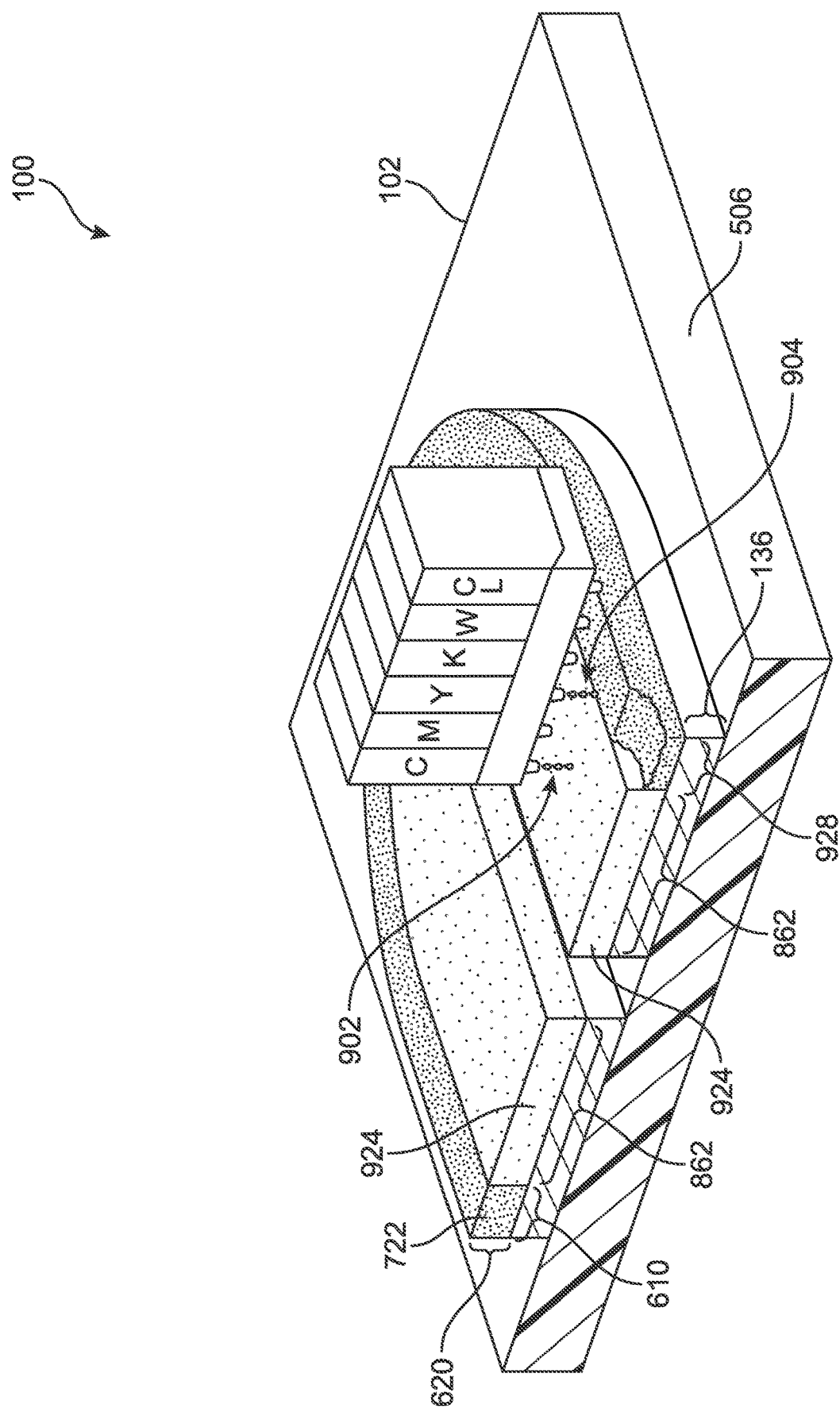
FIG. 9 shows a schematic view of dispensing a third print material onto the substrate of FIG. 6 to form the lower color graphic layer, in accordance with an exemplary embodiment.
Figure 10:
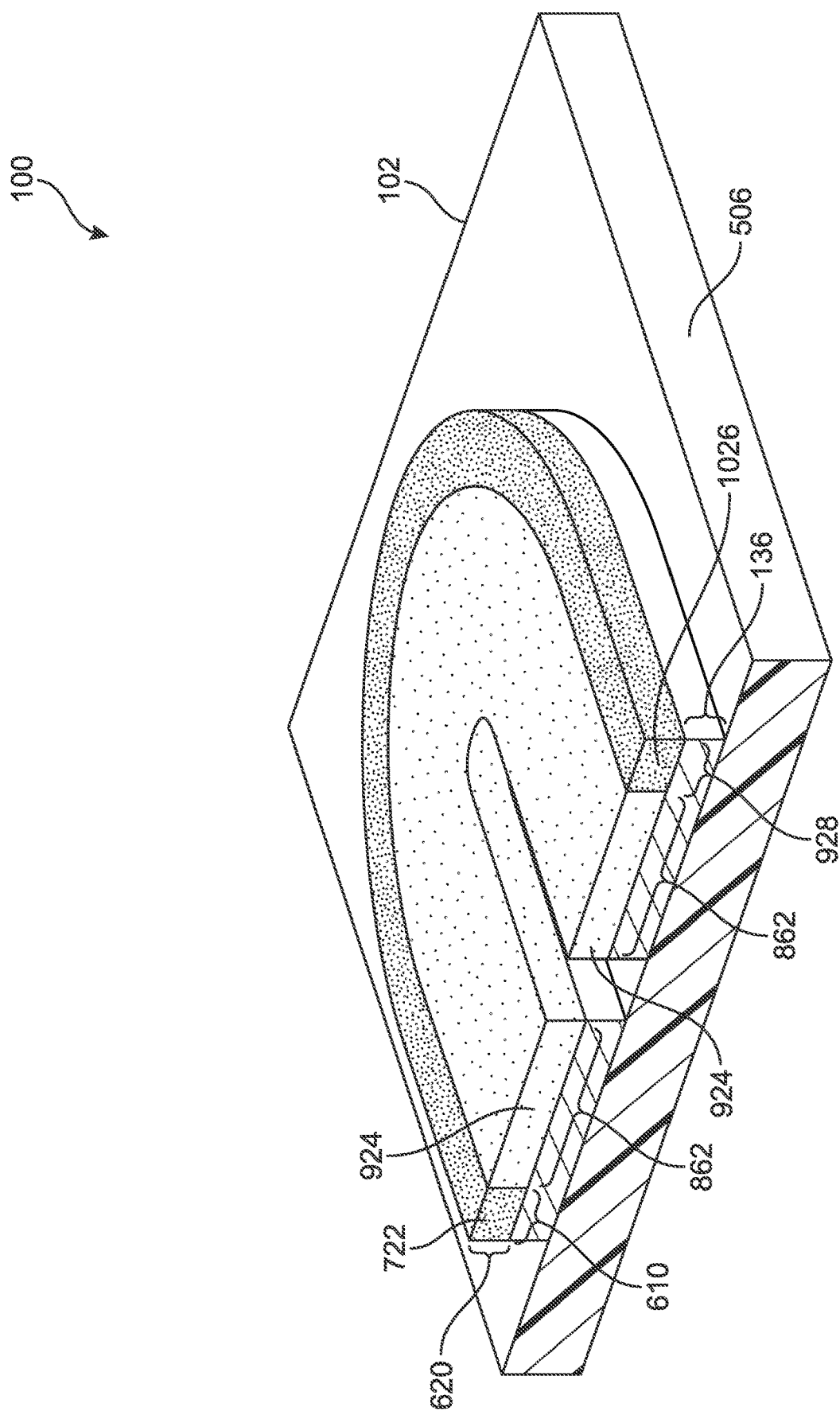
FIG. 10 shows an exemplary lower color graphic layer of a three-dimensional object, in accordance with an exemplary embodiment.

In some embodiments, a graphic layer may include any suitable number of portions having different compositions of print material. In some embodiments, three or more portions may be used to form a lower color graphic layer. Referring to FIGS. 9-10, lower color graphic layer 620 may further include third portion 1026 formed by dispensing and curing cyan print material 902 and yellow print material 904 in third region 928. It should be understood that the use of cyan print material and yellow print material is exemplary only and that any suitable color or no color (e.g., clear) may be used to form the various portions of the lower color graphic layer. In other embodiments, one or two portions may be used and/or portions of the color graphic layer may be formed of equivalent print material.

Some embodiments permit a color graphic layer to be formed using any suitable number of sublayers. For example, as shown in FIGS. 6-9, lower color graphic layer 620 may be a single layer that may be formed using a single pass of a printhead assembly and/or a curing lamp. In other embodiments, a color graphic layer may be formed of multiple sublayers using multiple passes of a printhead assembly and/or a curing lamp.

Some embodiments permit the lower color graphic layer to be visible. In some cases, the structural layer may be transparent to permit the lower color graphic layer to be visible. In other embodiments, the lower color graphic layer may be visible using other methods.

In some embodiments, the transparent structural layer may be formed using CMYK printing techniques as discussed above and/or using clear print material as discussed above. In other embodiments, other materials and/or techniques may be used to form the transparent structural layer.

Figure 11:
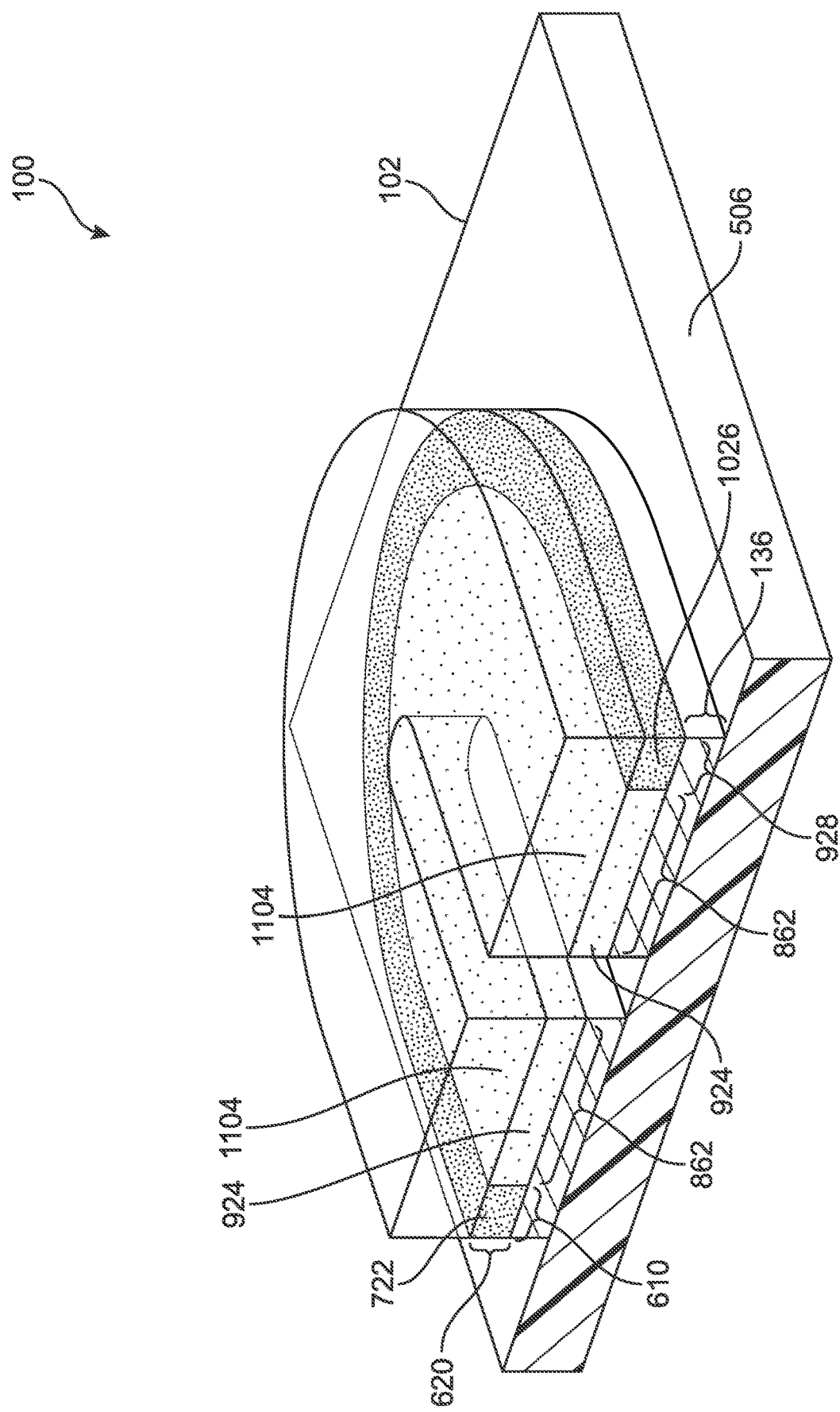
FIG. 11 shows an exemplary transparent structural layer of a three-dimensional object printed onto the lower color graphic layer of FIG. 10, in accordance with an exemplary embodiment.

In embodiments where the transparent structural layer may be formed using CMYK printing techniques, any suitable combination of print material may be used. Referring to FIG. 11, transparent structural layer 1104 may be printed, as in step 208 (see FIG. 4.), by dispensing clear print material onto lower color graphic layer 620 and by curing clear print material. As shown, in some embodiments, lower color graphic layer 620 may remain visible after forming transparent structural layer 1104. In other embodiments, other print material may be used.

In some embodiments, the transparent structural layer may be formed using any suitable number of sublayers and/or passes of a curing lamp. Referring to FIG. 11, transparent structural layer 1104 may be formed of a single sublayer using a single pass of a printhead assembly and/or a curing lamp. In other embodiments, a structural layer may be formed of multiple sublayers using multiple passes of a printhead assembly and/or a curing lamp (not shown).

Figure 12:
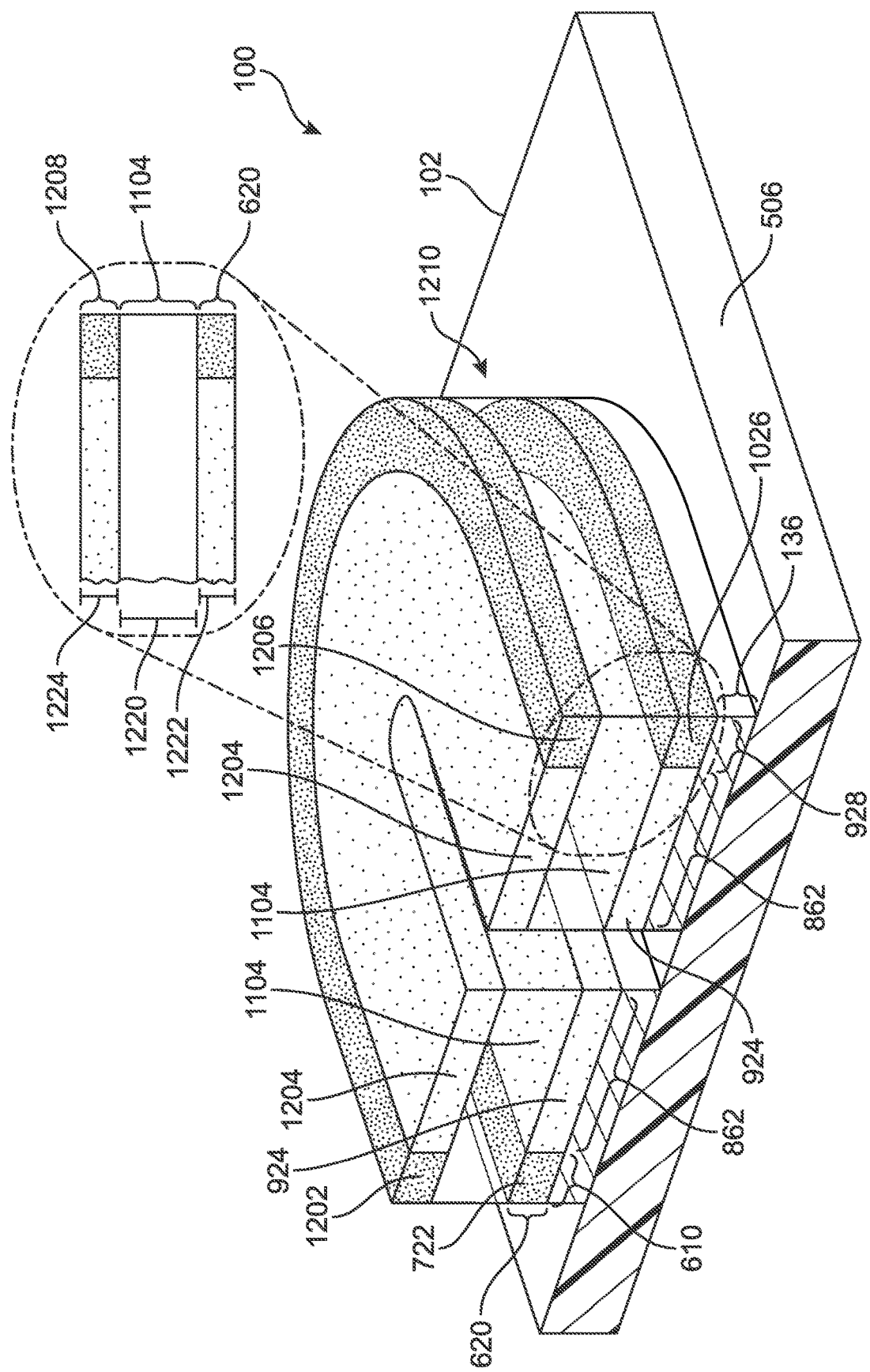
FIG. 12 shows an exemplary upper color graphic layer of a three-dimensional object printed onto the transparent structural layer of FIG. 11, in accordance with an exemplary embodiment.

In some embodiments, the transparent structural layer may have a thickness greater than a thickness of a color graphic layer. Referring to FIG. 12, transparent structural layer 1104 may have thickness 1220 greater than thickness 1222 of lower color graphic layer 620 and/or thickness 1224 of upper color graphic layer 1208. In other embodiments, the transparent structural layer may have a thickness of equal to or less than a thickness of lower color graphic layer and/or a thickness of the upper color graphic layer (not shown).

In some embodiments, the printing device may print, as in step 210 (see FIG. 4), an upper color graphic layer. In some embodiments, the upper color graphic layer may be formed using CMYK printing techniques as discussed above and/or using cyan print material, magenta print material, yellow print material, key print material, clear print material, white print material, and/or combinations thereof as discussed above. In other embodiments, other materials and/or techniques may be used to form the upper color graphic layer. In some embodiments, the combination of print material used to form the upper color graphic layer may be selected from a set of graphic information. In other embodiments, the combination of print material used may be selected differently.

In some embodiments, the color graphic design information may include a single set of graphic information representing a portion of a color graphic. In such instances, the lower color graphic layer may be printed using a single set of graphic information and the upper graphic layer may be printed using the single set of graphic information. In other embodiments, the color graphic design information may include a first set of graphic information representing a first portion of a color graphic and a second set of graphic information representing a second portion of a color graphic. In such instances, the lower color graphic layer may be printed using the first set of graphic information and the upper graphic layer may be printed using the second set of graphic information. It should be understood that in some embodiments a human user may generate each set of graphic information and in other embodiments the printing system may be configured to automatically generate each set of graphic information from a single set of graphic information and/or color graphic design information.

In embodiments where a second set of graphic information representing the second portion of the color graphic is used, the second set of graphic information may have one or more features of the first set of graphic information representing the first portion of the color graphic. For example, the second set of graphic information may contain identical pigments to the color graphic or different pigments to the color graphic. In another example, the second set of graphic information may include a color indicating a portion or subset of pigments of the target color composition or second set of graphic information may include a color indicating the entire target color composition. In other embodiments, the second set of graphic information may be different from the first set of graphic information.

In some embodiments, the second set of graphic information and the first set of graphic information may have identical pigments. For example, the second set of graphic information may include each of the pigments of the color graphic, and the first set of graphic information may include each of the pigments of the color graphic. In other embodiments, the second set of graphic information and the first set of graphic information may have different pigments.

In some embodiments, the second set of graphic information may be visually equivalent to the first set of graphic information. For example, the second set of graphic information may have a light green color that may be printed using 20 drops of cyan print material and 20 drops of yellow print material. In the example, the first set of graphic information may have also a light green color that may be printed using 20 drops of cyan print material and 20 drops of yellow print material. In other embodiments, the portion of the target color composition of the second set of graphic information and the portion of the target color composition of the first set of graphic information may be different. For example, the second set of graphic information may have a dark green color that may be printed using 30 drops of cyan print material and 30 drops of yellow print material. In the example, the first set of graphic information may have a light green color that may be printed using 10 drops of cyan print material and 10 drops of yellow print material.

In some embodiments, the combination of the second set of graphic information and the first set of graphic information may be visually equivalent to the color graphic design. For example, the second set of graphic information may have a light green color that may be printed using 20 drops of cyan print material and 20 drops of yellow print material. In the example, the second set of graphic information may be too light to be visually equivalent to a color graphic design having a dark green target color that may be printed using 50 drops of cyan print material and 50 drops of yellow print material. However, the first set of graphic information may have a light green color that may be printed using 30 drops of cyan print material and 30 drops of yellow print material. As such, the combination of the second set of graphic information and the first set of graphic information may, when viewed together, be visually equivalent to the color graphic represented by the color graphic design information. Therefore, a combination of an upper color graphic layer that is printed using the second set of graphic information and a lower color graphic layer that is printed using the first set of graphic information may be visually equivalent to the target color composition represented by the color graphic. In other embodiments, the combination of the second set of graphic information and the first set of graphic information may be visually different from the color graphic.

Generally, any suitable combination of print material and/or pigments may be used to form the top layer. Referring to FIG. 12, upper color graphic layer 1208 may include first region 1202, second region 1204, and third region 1206, thereby forming three-dimensional object 1210. In the example, first region 1202 may be printed by dispensing cyan print material and yellow print material onto transparent structural layer 1104. In the example, second region 1204 may be printed by dispensing clear print material and magenta print material onto transparent structural layer 1104. In the example, third region 1206 may be printed by dispensing cyan print material and yellow print material onto transparent structural layer 1104. As shown, in some embodiments, lower color graphic layer 620 may remain visible after forming upper color graphic layer 1208 and transparent structural layer 1104. In other embodiments, the upper color graphic layer may be formed of different print material and/or pigments.

In some embodiments, the upper color graphic layer may have one or more features of the lower color graphic layer. For example, the upper color graphic layer may be formed of light curable material and cured by a cure lamp. In another example, the upper color graphic layer may permit dispensing of print material from multiple cartridges. In one example, the upper color graphic layer may be formed by intermixing print material above and/or directly onto the structural layer. In yet another example, the upper color graphic layer may have portions having different compositions of print material. In another example, the upper color graphic layer may be formed using any suitable number of sublayers and/or passes of a cure lamp. In other embodiments, the upper color graphic layer and the lower color graphic layer may be different.

Figure 13:
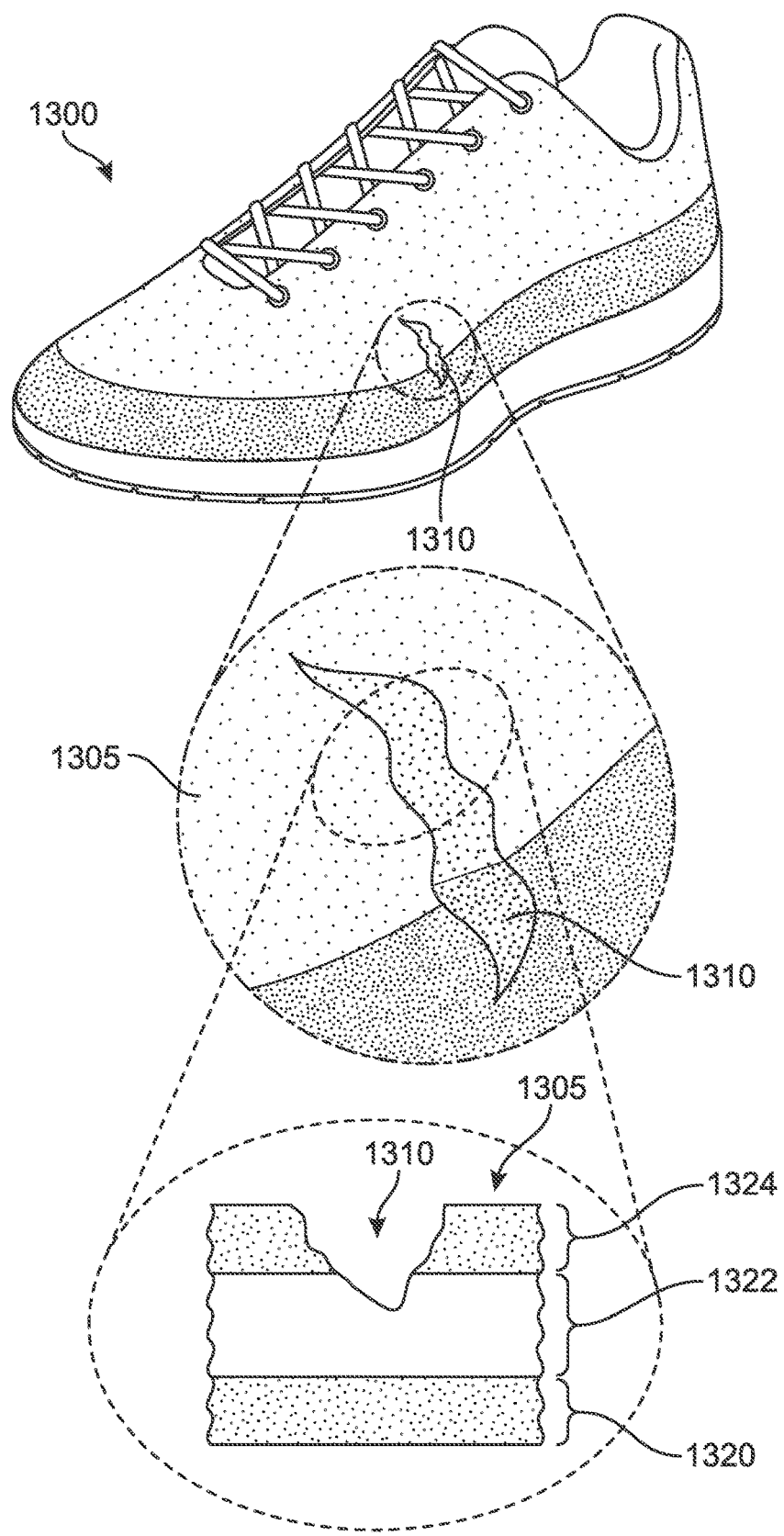
FIG. 13 shows the exemplary three-dimensional object of FIG. 12 with an abrasion, in accordance with an exemplary embodiment.

Referring to FIG. 13, and consistent with an embodiment, an article, such as article of footwear 1300, may include one or more three-dimensional objects. In some embodiments, a three-dimensional object may be printed according to printing techniques discussed herein with reference to any of FIGS. 1-12. For example, upper color graphic layer 1324 of three-dimensional object 1305 may be formed using techniques and/or print materials similar to techniques and/or print materials used to form upper color graphic layer 1208 (see FIG. 12). In another example, transparent structural layer 1322 of three-dimensional object 1305 may be formed using techniques and/or print materials similar to techniques and/or print materials used to form transparent structural layer 1104 (see FIG. 11). In a further example, lower color graphic layer 1320 of three-dimensional object 1305 may be formed using techniques and/or print materials similar to techniques and/or print materials used to form lower color graphic layer 620 (see FIG. 6). In other embodiments, article of footwear 1300 may be printed using different methods, techniques, and/or materials.

Some embodiments may include provisions for reducing the appearance of wear-and-tear of the article of footwear. In some cases, such wear-and-tear may take the form of any number of scratches, abrasions, or mars in the finish of three-dimensional object 1305. While such damage to the finish of three-dimensional object 1305 may be undesirable, it may also be unavoidable during the rigors of use demanded of article of footwear 1300. Therefore, it is desirable to minimize the visibility of any such damage during the usable lifetime of article of footwear 1300. In some cases, such minimization may be achieved by implementing one or more of the printing techniques disclosed herein. In other embodiments, other provisions may be used for reducing the appearance of wear-and-tear of the article of footwear.

Figure 14:
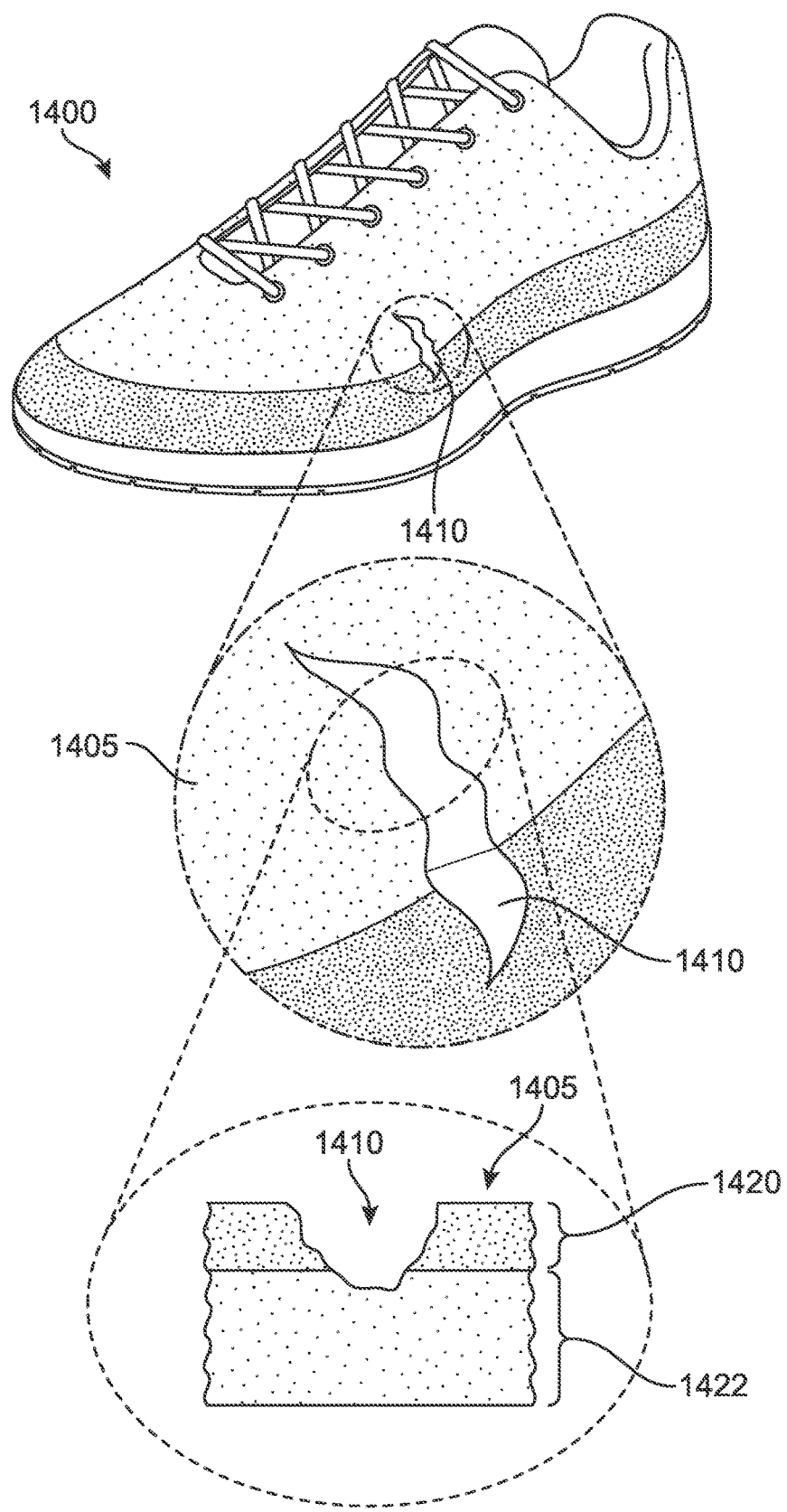
FIG. 14 shows an alternative three-dimensional object with an abrasion.

Consistent with some embodiments and still referring to FIG. 13, exemplary wear-and-tear is shown by abrasion 1310 in article of footwear 1300. Light rays passing through lower color graphic layer 1320 layer, transparent structural layer 1322, and upper color graphic layer 1324 may not result in a high contrast difference from light rays passing through abrasion 1310, lower color graphic layer 1320 layer, and transparent structural layer 1322. As discussed earlier, an observer may view a combination of light rays reflected from more than one layer of three-dimensional object 1305, as well as from the region exposed by abrasion 1310. That is, three-dimensional object 1305 may include multiple color graphic layers that may permit abrasion 1310 to appear with a slightly lighter color or slightly darker color than the overall color of three-dimensional object 1305. As shown in FIG. 14, this contrasts with what may be observed when viewing light reflected similarly from article of footwear 1400 having only single color graphic layer 1420 disposed on top of white layer 1422.

Referring to FIG. 14, another exemplary wear-and-tear is also shown by abrasion 1410 in article of footwear 1400. Article of footwear 1400 may include three-dimensional object 1405 having white layer 1422 and single color graphic layer 1420. As shown, single color graphic layer 1420 forms an exposed surface of three-dimensional object 1405. Light rays passing through three-dimensional object 1405 may result in a high contrast difference between three-dimensional object 1405 and that of abrasion 1410. An observer may view light that has passed through the opening exposed by abrasion 1410 and reflected off of white layer 1422 back to the observer. The light may also pass through and be reflected from one or more portions of abrasion 1410. Thus, when viewing three-dimensional object 1405 and abrasion 1410, abrasion 1410 may appear with a high contrast difference against three-dimensional object 1405 due to the exposure of white layer 1422. As also shown in FIG. 14, abrasion 1410 may appear as a white mark relative to the balance of three-dimensional object 1405.

Consistent with an embodiment, color durability may be achieved according to the disclosed techniques. That is, damage due to scratching, abrasion, or otherwise marring a surface printed using disclosed techniques may be less visible upon observation than similar damage inflicted on a surface printing using existing techniques. Color printing according to the disclosed techniques may be more durable and damage may be less visible.

Some embodiments can include provisions that permit protection from erosion and/or abrasion. In some cases, the protection from erosion and/or abrasion may be permitted by use of a protective transparent layer. In other cases, the protection from erosion and/or abrasion may be permitted by using other techniques, materials, and/or methods.

Figure 15:
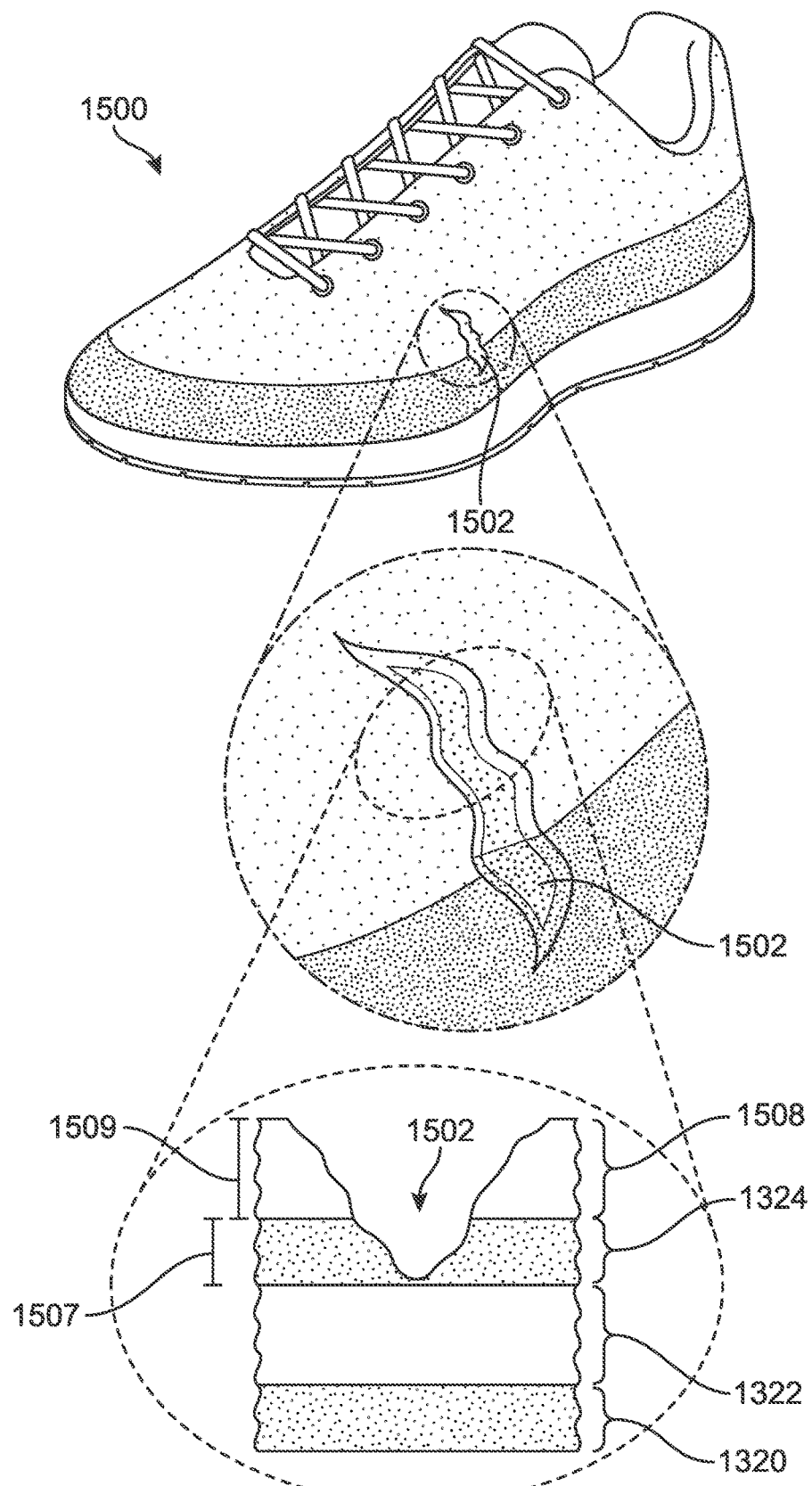
FIG. 15 shows an optional protective transparent layer of a three-dimensional object printed onto the upper color graphic layer of FIG. 12, in accordance with an exemplary embodiment.

In those instances where a protective transparent layer is used, any suitable material and/or technique may be used to form the protective transparent layer. In some embodiments, the protective transparent layer may be formed using CMYK printing techniques as discussed above and/or using clear print material as discussed above. Referring to FIG. 15, article of footwear 1500 may be substantially similar to article of footwear 1300 except that article of footwear 1500 may further include an optional protective transparent layer 1508. In the example, optional protective transparent layer 1508 may prevent erosion of upper color graphic layer 1324. As illustrated in FIG. 15, optional protective transparent layer 1508 may provide protection from abrasion. For example, abrasion 1502 may extend into a smaller portion of upper color graphic layer 1324 than abrasion 1310 extends into upper color graphic layer 1324 of FIG. 13. In other embodiments, a protective transparent layer may be omitted (see FIG. 13) and/or other provisions for protection from erosion and/or abrasion may be used.

In some embodiments, the protective transparent layer may have a thickness greater than a thickness of a color graphic layer. Referring to FIG. 15, optional protective transparent layer 1508 may have thickness 1509. In the example, thickness 1509 may be greater than thickness 1507 of upper color graphic layer 1324. In other embodiments, the protective transparent layer may have a thickness equal to a thickness of a color graphic layer (see FIG. 19). In yet other embodiments, the protective transparent layer may have a thickness less than a thickness of a color graphic layer (not shown).

Some embodiments permit use of a non-white substrate. As used herein, a non-white substrate may include an exposed surface of a substrate that includes one or more non-white pigments. For example, a non-white substrate may include an exposed surface having at least a portion appearing off-white, gray, or black. In another example, a non-white substrate may include an exposed surface having an appearance that includes any non-white color in the visible color spectrum. In some embodiments, a non-white substrate may have different color properties at different positions of the non-white substrate. For example, a first portion of a non-white substrate may have a bright white appearance while a second portion of the non-white substrate may have an off-white, dark white, or gray appearance. In other embodiments, a non-white substrate may be different.

Figure 16:
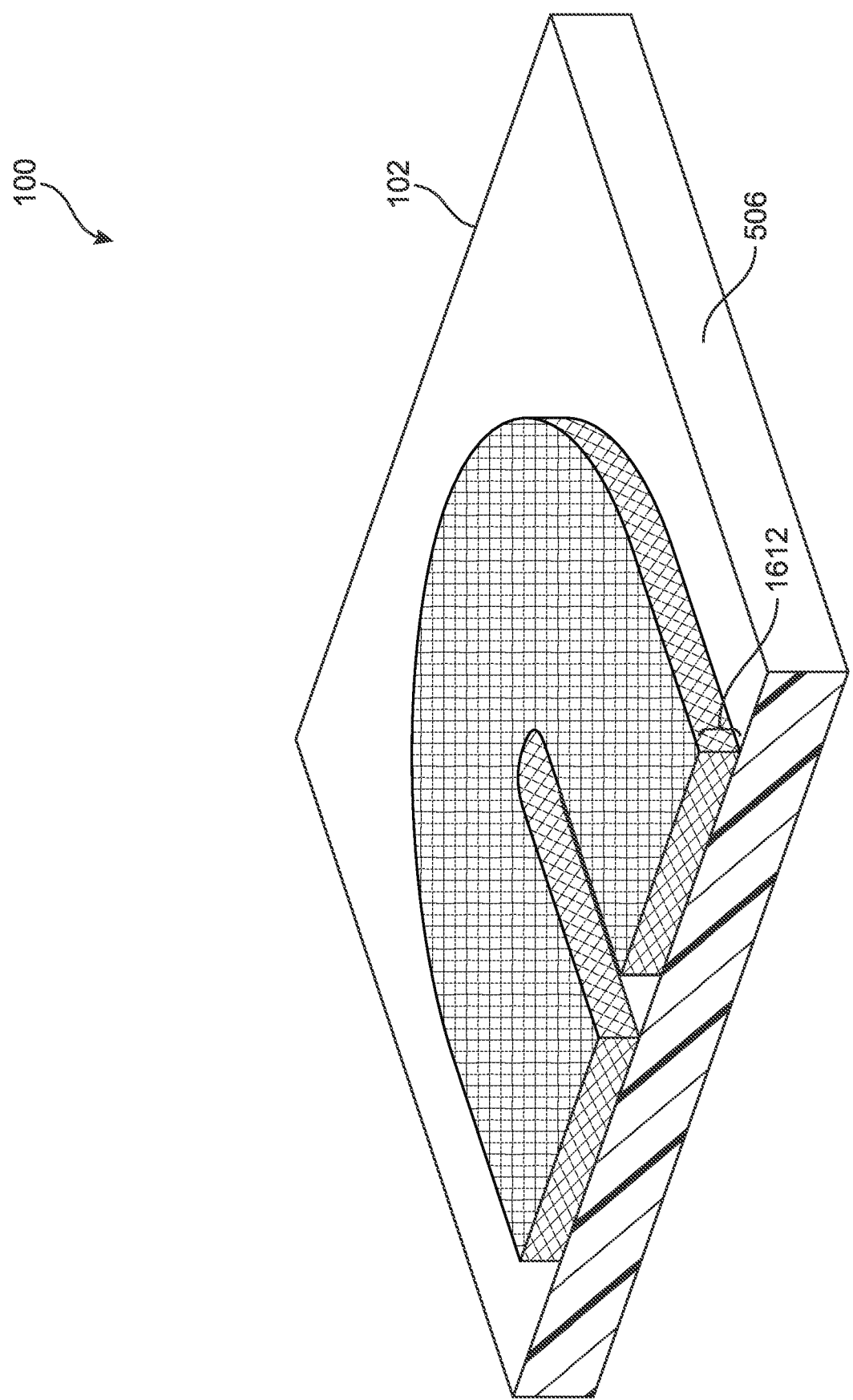
FIG. 16 shows an exemplary non-white substrate for a three-dimensional object, in accordance with an exemplary embodiment.

Generally, the non-white substrate may be formed of any suitable material. Such material may include, for example, textile, natural fabric, synthetic fabric, knit, woven material, nonwoven material, mesh, leather, synthetic leather, polymer, rubber, and foam, or any combination of them. Referring to FIG. 16, non-white substrate 1612 may be formed using a fiber or yarn to achieve a desired strength for a resulting article of footwear. In other embodiments, a non-white substrate may be formed of other materials.

Figure 17:
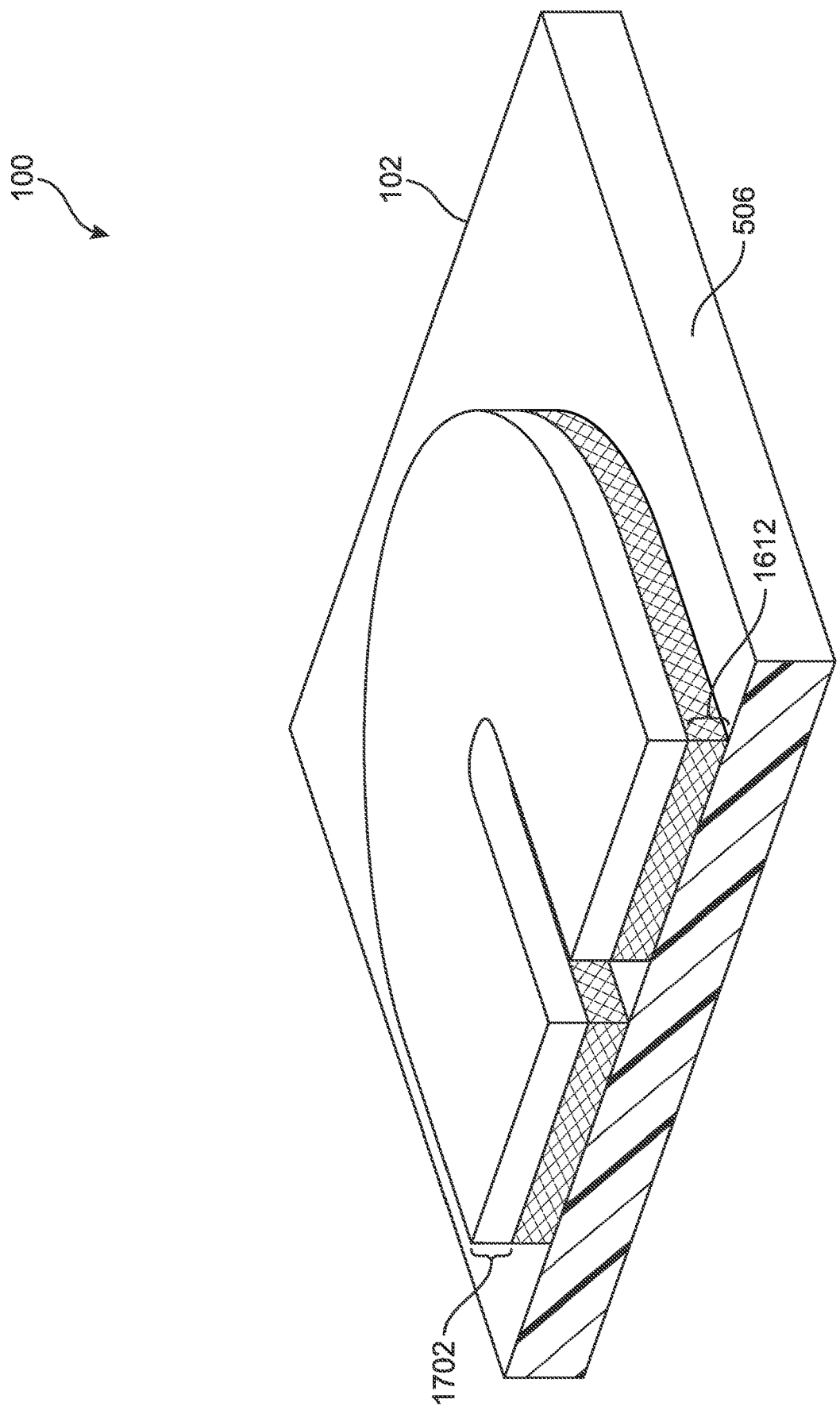
FIG. 17 shows an exemplary white layer of a three-dimensional object printed onto the non-white substrate of FIG. 16, in accordance with an exemplary embodiment.

Generally, the white layer may be formed using any suitable method, technique, and/or material to permit a three-dimensional object to have a consistent appearance. In some embodiments, the white layer may be formed using CMYK printing techniques as discussed above and/or using white print material as discussed above. Referring to FIG. 17, white layer 1702 may be formed onto non-white substrate 1612. In the example, printing device 102 may print white layer 1702 by dispensing white print material onto non-white substrate 1612 and by curing the white material after dispensing. In other embodiments, the white layer may be formed using other methods, techniques, and/or print materials.

Generally, any suitable combination of layers may be formed onto the white layer. In some embodiments, a lower color graphic layer, a transparent structural layer, and an upper color graphic layer may be formed onto the white layer. In some embodiments, a lower color graphic layer, a transparent structural layer, an intermediate color graphic layer, an intermediate transparent structural layer, and an upper color graphic layer may be formed on the white layer (see FIG. 21). In some embodiments, a lower color graphic layer, an opaque structural layer, an intermediate color graphic layer, an intermediate opaque structural layer, and an upper color graphic layer may be formed on the white layer (see FIG. 22). In other embodiments, fewer and/or additional layers may be formed on the white layer.

Figure 18:
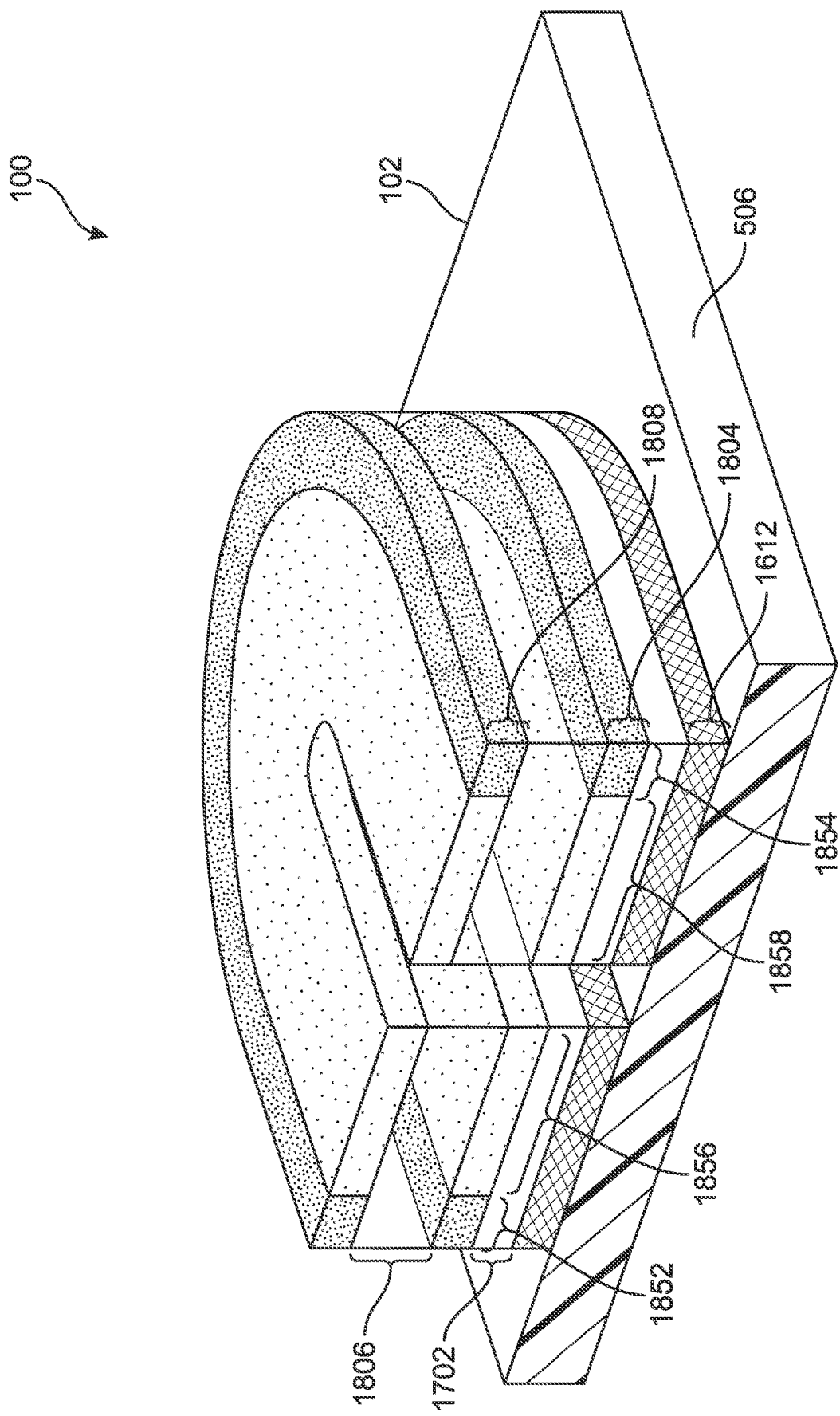
FIG. 18 shows an exemplary three-dimensional object printed onto the white layer of FIG. 17, in accordance with an exemplary embodiment.

In embodiments where a lower color graphic layer is used with a white layer, the lower color graphic layer may be formed using any suitable technique. In some embodiments, the lower color graphic layer may be formed using CMYK printing techniques as discussed above with respect to FIGS. 1-12. Referring to FIG. 18, lower color graphic layer 1804 may be formed using techniques and/or print materials similar to techniques and/or print materials used to form lower color graphic layer 620 (see FIG. 6). In the example, the printing device may print region 1852 of lower color graphic layer 1804 and region 1854 of lower color graphic layer 1804 using cyan print material and yellow print material. In the example, the printing device may print region 1856 of lower color graphic layer 1804 and region 1858 of lower color graphic layer 1804 using magenta print material and clear print material. In other embodiments, the lower color graphic layer may be formed differently.

In embodiments where a transparent structural layer is used with a white layer, the transparent structural layer may be formed using any suitable technique. In some embodiments, the transparent structural layer may be formed using CMYK printing techniques as discussed above with respect to FIGS. 1-12. Referring to FIG. 18, transparent structural layer 1806 may be formed using techniques and/or print materials similar to techniques and/or print materials used to form transparent structural layer 1104 (see FIG. 11). In the example, the printing device may print transparent structural layer 1806 using clear print material. In other embodiments, the transparent structural layer may be formed differently.

In embodiments where an upper color graphic layer is used with a white layer, the upper color graphic layer may be formed using any suitable technique. In some embodiments, the upper color graphic layer may be formed using CMYK printing techniques as discussed above with respect to FIGS. 1-12. Referring to FIG. 18, upper color graphic layer 1808 may be formed using techniques and/or print materials similar to techniques and/or print materials used to form upper color graphic layer 1208 (see FIG. 12). In the example, the printing device may print region 1852 of upper color graphic layer 1808 and region 1854 of upper color graphic layer 1808 using cyan print material and yellow print material. In the example, the printing device may print region 1856 of upper color graphic layer 1808 and region 1858 of upper color graphic layer 1808 using magenta print material and clear print material. In other embodiments, the upper color graphic layer may be formed differently.

Some embodiments can include provisions that permit protection from erosion and/or abrasion of three-dimensional objects printed on non-white substrates. In some cases, the protection from erosion and/or abrasion may be permitted by use of an optional protective transparent layer. In other cases, the protection from erosion and/or abrasion may be permitted by using other techniques, materials, and/or methods.

Figure 19:
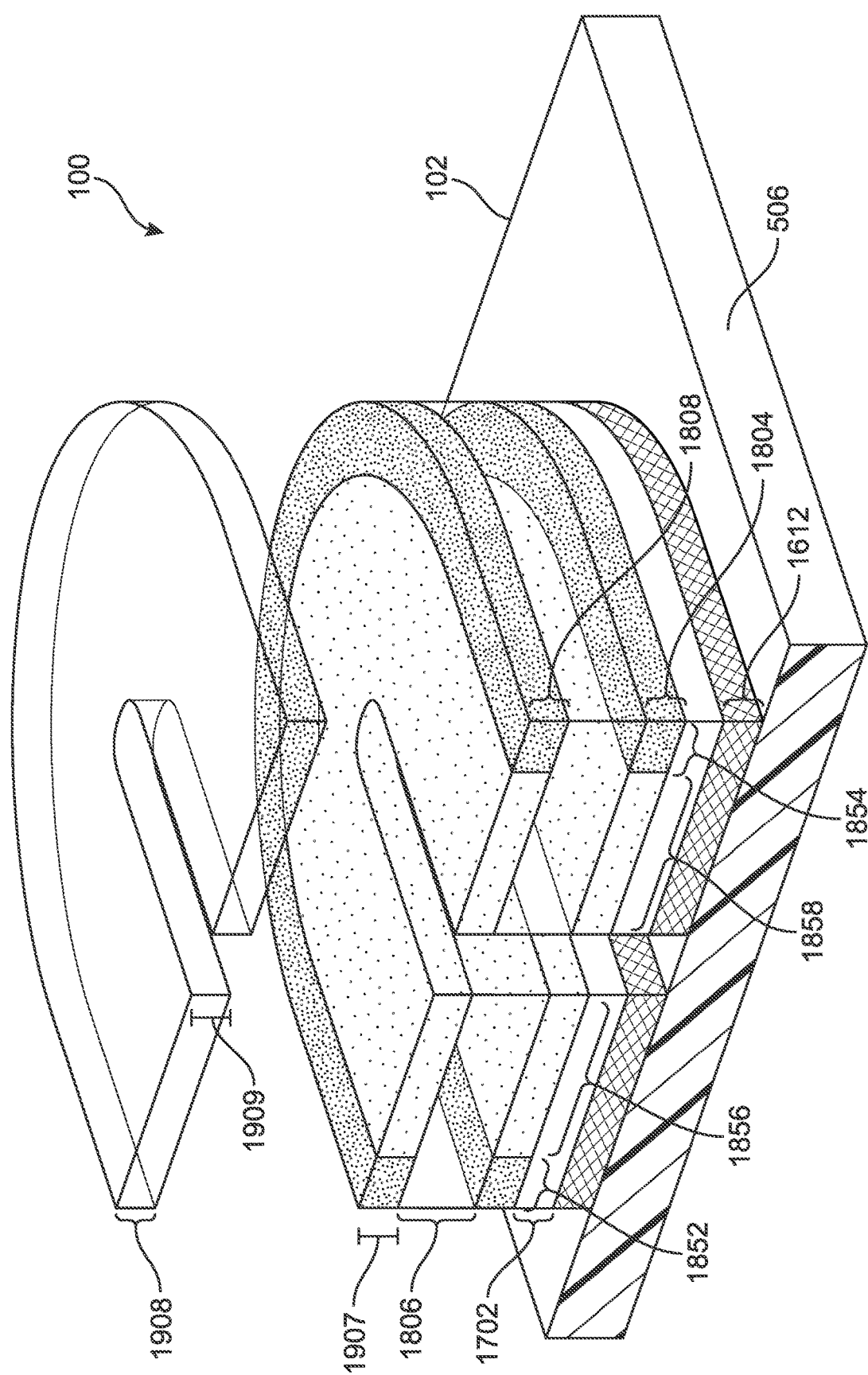
FIG. 19 shows an optional protective transparent layer of a three-dimensional object printed onto the upper color graphic layer of FIG. 18, in accordance with an exemplary embodiment.

In embodiments where a protective transparent layer is used to permit protection from erosion and/or abrasion of three-dimensional objects printed on non-white substrates, any suitable materials and/or techniques may be used to form the protective transparent layer. For example, the protective transparent layer may be formed using CMYK printing techniques as discussed above and/or using clear print material as discussed above with respect to FIG. 15. Referring to FIG. 19, protective transparent layer 1908 may prevent erosion of upper color graphic layer 1808. Additionally, protective transparent layer 1908 may provide protection from abrasion. In other embodiments, a protective transparent layer may be omitted (see FIG. 18) and/or other provisions for protection from erosion and/or abrasion may be used.

In some embodiments, the protective transparent layer may have a thickness equal to a thickness of a color graphic layer. Referring to FIG. 19 protective transparent layer 1908 has thickness 1909 equal to thickness 1907 of upper color graphic layer 1808. In other embodiments, the protective transparent layer may have a thickness greater than a thickness of a color graphic layer (see FIG. 15). In yet other embodiments, the protective transparent layer may have a thickness less than a thickness of a color graphic layer (not shown).

Some embodiments may include provisions for improving an appearance of the three-dimensional object. In some cases, a second set of graphic information representing a second portion of a color graphic and a first set of graphic information representing a first portion of the color graphic may have different pigments, to allow an aesthetic effect. In other cases, the second set of graphic information and the first set of graphic information may have identical pigments (see FIG. 12).

Generally, a set of graphic information may have one or more pigments omitted from another set of graphic information. In some embodiments, the second set of graphic information may have one or more pigments omitted from the first set of graphic information. Similarly, in some embodiments, the first set of graphic information may have one or more pigments omitted from the second set of graphic information. For example, the printing system may designate a pixel of the first set of graphic information as yellow and designate a pixel of a second set of graphic information as cyan when a pixel of the color graphic is green. In the example, the printing device may print a region of the lower color graphic layer that corresponds with the pixel using yellow print material and print another color graphic layer using cyan print material such that a combination of the first set of graphic information, yellow, and the second set of graphic information, cyan, is visually equivalent to the color graphic, green. In other embodiments, a single combination of one or more pigments may be included in each set of graphic information of color graphic design information.

Figure 20:
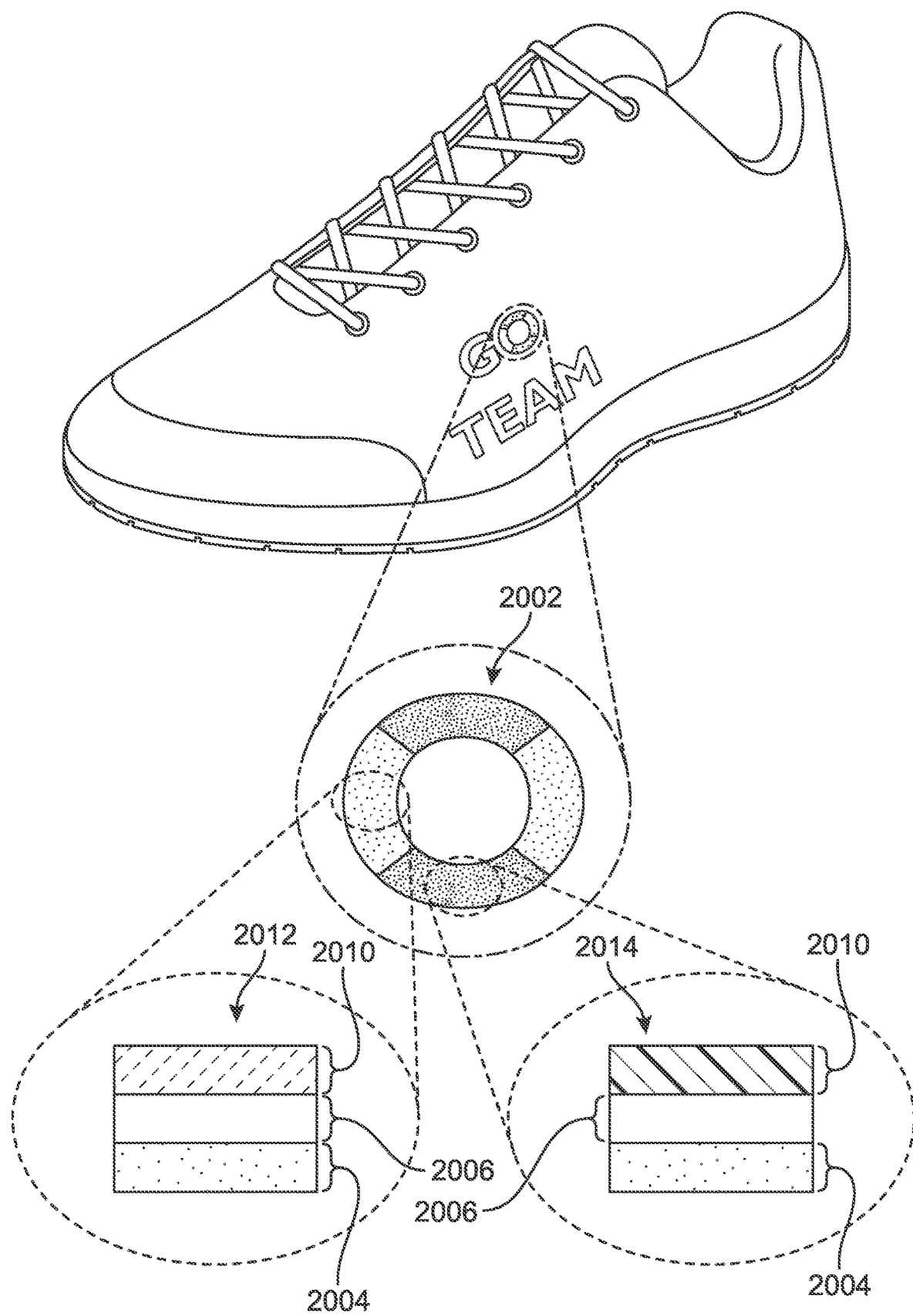
FIG. 20 shows an exemplary three-dimensional object with an upper color graphic layer and a lower color graphic layer having different pigments, in accordance with an exemplary embodiment.

In some embodiments, printed color graphic layers may include different print material and/or pigments. It should be understood that such provisions may be implemented in any suitable three-dimensional object. For example, three-dimensional object 2002 may further include a protective transparent layer (not shown). In another example, three-dimensional object 2002 may further include a white layer (not shown). In another example, three-dimensional object 2002 (see FIG. 20) may further include a transparent base layer (not shown). Referring to FIG. 20, lower color graphic layer 2004 of three-dimensional object 2002 may be formed of yellow print material. In the example, upper color graphic layer 2010 at first region 2012 of three-dimensional object 2002 may be formed of cyan print material. In the example, transparent structural layer 2006 allows a viewer to see a combination of the pigments of upper color graphic layer 2010 and lower color graphic layer 2004 at first region 2012, for example, green. In other embodiments, different combinations of print material may be used.

Some embodiments include provisions that permit simplified printing of a color graphic layer. In some instances, printing may be simplified by maintaining a print material and/or pigments of a color graphic layer while changing a print material and/or pigments of another color graphic layer. Referring to FIG. 20, second region 2014 may be similar to first region 2012 except that upper color graphic layer 2010 at second region 2014 is formed of magenta print material instead of cyan print material. As shown, three-dimensional object 2002 may appear to be green in first region 2012 and blue in second region 2014. In this manner, printing may be simplified since pigments of lower color graphic layer 2004 may be maintained (e.g., yellow print material) while allowing three-dimensional object 2002 to appear to have different colors. In other embodiments, printing may be simplified using other methods, techniques, and technologies.

Some embodiments can include provisions that permit durability from abrasion of portions of a three-dimensional object. In some embodiments, one or more intermediate color graphic layers may be used to facilitate an improved durability from abrasion of portions of a three-dimensional object. It should be understood that although a single intermediate color graphic layer is illustrated in the figures, any suitable number of intermediate color graphic layers may be used. As used herein, one or more intermediate color graphic layers may refer to one or more layers having pigments that are separated by structural layers. As described further, such structural layers may be transparent, opaque, and/or translucent. In other embodiments, other provisions may be included to facilitate an improved durability from abrasion of portions of a three-dimensional object. For example, the three-dimensional object may include a protective layer.

Figure 21:
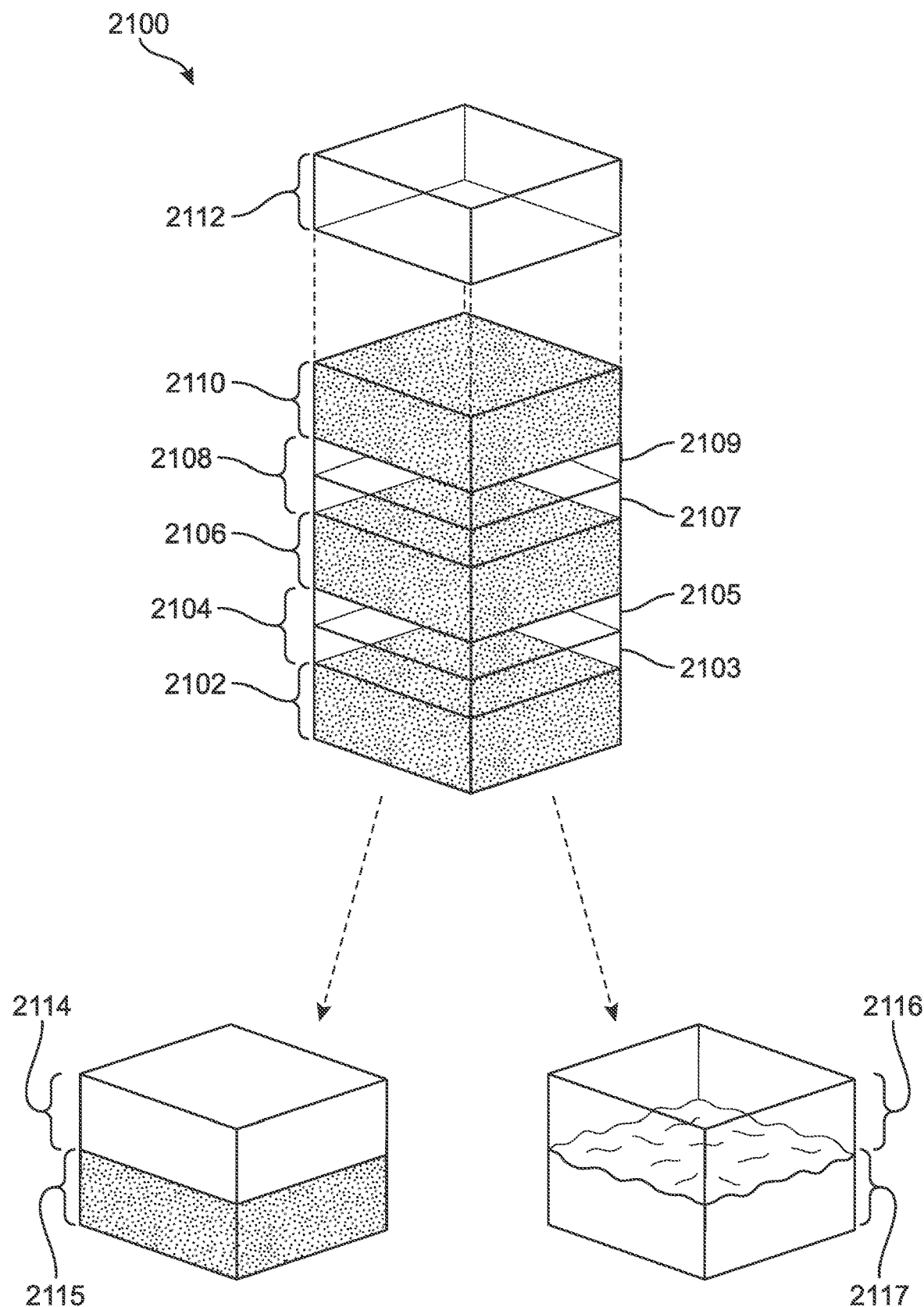
FIG. 21 shows an exemplary three-dimensional object including an upper color graphic layer, an intermediate color graphic layer, and a lower color graphic layer and including transparent structural layers, in accordance with an exemplary embodiment.

In some embodiments, one or more intermediate color graphic layers may be positioned between an upper color graphic layer and a lower color graphic layer. Referring to FIG. 21, intermediate color graphic layer 2106 may be positioned between upper color graphic layer 2110 and lower color graphic layer 2102. In other embodiments, one or more intermediate color graphic layers may be positioned differently.

In some embodiments, the combination of print material used to form the intermediate color graphic layer may be selected according to a set of graphic information of color graphic design information. In some embodiments, the color graphic design information may include a single set of graphic information representing a portion of a color graphic. In such instances, the lower color graphic layer may be printed using a single set of graphic information, the upper graphic layer may be printed using the single set of graphic information, and the intermediate color graphic layer may be printed using the single set of graphic information. In other embodiments, the color graphic design information may include a first set of graphic information representing a first portion of a color graphic, a second set of graphic information representing a second portion of a color graphic, and a third set of graphic information representing an intermediate portion of the color graphic. In such instances, the lower color graphic layer may be printed using the first set of graphic information, the intermediate graphic layer may be printed using the third set of graphic information, and the upper graphic layer may be printed using the second set of graphic information.

In embodiments where a third set of graphic information representing an intermediate portion of the color graphic is used, the third set of graphic information may have one or more features of the first set of graphic information representing the first portion of the color graphic and/or the second set of graphic information representing the second portion of the color graphic. For example, the third set of graphic information may contain identical pigments to the color graphic or different pigments to the color graphic. In another example, the third set of graphic information may have a color that may be printed using only a portion of the target color composition or the third set of graphic information may have a color that may be printed using the entire target color composition. In other embodiments, the third set of graphic information may be different from the first set of graphic information and/or the second set of graphic information.

In some embodiments, each set of graphic information included in the color graphic design information may have identical pigments. For example, the third set of graphic information may include each of the pigments of the color graphic, the first set of graphic information may include each of the pigments of the color graphic, and the second set of graphic information may include each of the pigments of the color graphic. In other embodiments, different sets of graphic information may have different pigments.

In some embodiments, the third set of graphic information representing the intermediate portion of the color graphic may be visually equivalent to the first set of graphic information representing the first portion of the color graphic and/or the second set of graphic information representing the second portion of the color graphic. For example, the third set of graphic information may indicate 20 drops of cyan print material and 20 drops of yellow print material. In the example, the first set of graphic information may indicate 20 drops of cyan print material and 20 drops of yellow print material, and the second set of graphic information may indicate 20 drops of cyan print material and 20 drops of yellow print material. In other embodiments, the third set of graphic information, the second set of graphic information, and/or the first set of graphic information may be visually different.

Generally, a combination of each set of graphic information included in color graphic design information may be visually equivalent to the color graphic design. In embodiments using an upper color graphic layer, an intermediate color graphic layer, and a lower color graphic layer, a combination of the third set of graphic information, the second set of graphic information, and the first set of graphic information may be visually equivalent to the color graphic design. For example, the third set of graphic information may indicate 20 drops of cyan print material and 20 drops of yellow print material. In the example, the second set of graphic information may indicate 20 drops of cyan print material and 20 drops of yellow print material. In the example, the combination of the second set of graphic information and the third set of graphic information may be too light to be visually equivalent to a color graphic indicating 70 drops of cyan print material and 70 drops of yellow print material. However, the first set of graphic information may indicate 30 drops of cyan print material and 30 drops of yellow print material. As such, the combination of the first set of graphic information, the second set of graphic information, and the third set of graphic information may be visually equivalent to the color graphic design. In other embodiments, the combination of each set of graphic information included in color graphic design information may be visually different to the color graphic.

In some embodiments, one or more intermediate color graphic layers may be formed using CMYK printing techniques as discussed above and/or using cyan print material, magenta print material, yellow print material, key print material, clear print material, white print material, and/or combinations thereof as discussed above. Referring to FIG. 21, intermediate color graphic layer 2106 may be printed by dispensing cyan print material and yellow print material. In other embodiments, other materials and/or techniques may be used to form one or more intermediate color graphic layers.

In some embodiments, one or more intermediate color graphic layers may each have one or more features of the lower color graphic layer and/or the upper color graphic layer. For example, one or more intermediate color graphic layers may be formed of light curable material and cured by a cure lamp. In another example, one or more intermediate color graphic layers may permit dispensing of print material from multiple cartridges. In one example, one or more intermediate color graphic layers may be formed by intermixing print material above and/or directly onto the structural layer. In yet another example, one or more intermediate color graphic layers may have portions having different compositions of print material. In another example, one or more intermediate color graphic layers may be formed using any suitable number of sublayers and/or passes of a cure lamp. In other embodiments, one or more intermediate color graphic layers may be different than the upper color graphic layer and/or the lower color graphic layer.

In some embodiments, each intermediate color graphic layer may be printed with a corresponding transparent structural layer. For example, as shown in FIG. 21, three-dimensional object 2100 may include intermediate color graphic layer 2106 printed onto an uppermost layer of one or more inner transparent structural layers 2104. In this embodiment, inner transparent structural layers 2104 are comprised of inner transparent structural layer 2103 and inner transparent structural layer 2105. In other embodiments, one, two, three or more inner transparent structural layers could be used. In the example, intermediate color graphic layer 2106 may be printed with a corresponding one or more upper (or outer) transparent structural layers 2108. In this embodiment, upper transparent structural layers 2108 are further comprised of upper transparent structural layer 2107 and upper transparent structural layer 2109. In other embodiments, one, two, three or more upper transparent structural layers could be used. It should be understood that a three-dimensional object may include any suitable number of pairs of an intermediate color graphic layer and a corresponding transparent structural layer. In other embodiments, the corresponding transparent structural layer may be omitted.

Generally, any suitable materials and/or techniques may be used to form the inner transparent structural layer and/or the outer transparent structural layer. In some embodiments, the inner transparent structural layer and/or the outer transparent structural layer transparent structural layer may have one or more features of a transparent structural layer discussed above with respect to FIG. 11. For example, the inner transparent structural layer and/or the outer transparent structural layer transparent structural layer may be formed of clear print material and cured by a cure lamp. In another example, the inner transparent structural layer and/or the outer transparent structural layer transparent structural layer may permit dispensing of print material from multiple cartridges. In one example, the inner transparent structural layer and/or the outer transparent structural layer transparent structural layer may be formed by intermixing print material above and/or directly onto the structural layer. In another example, the inner transparent structural layer and/or the outer transparent structural layer transparent structural layer may be formed using any suitable number of sublayers and/or passes of a cure lamp. In other embodiments, the inner transparent structural layer and/or the outer transparent structural layer transparent structural layer and the transparent structural layer may be different.

In embodiments where an intermediate color graphic layer is used to form a three-dimensional object, the three-dimensional object may have any suitable number and type of layers to facilitate a formation of the three-dimensional object. In some embodiments, the three-dimensional object may include a lower color graphic layer, an inner transparent structural layer, an intermediate color graphic layer, an outer transparent structural layer, and an upper color graphic layer. In other embodiments, the three-dimensional object may be different.

In some embodiments, the lower color graphic layer used in a three-dimensional object having an intermediate color graphic layer may have one or more features of lower color graphic layer 620 illustrated in FIG. 10. For example, referring to FIG. 21, lower color graphic layer 2102 of three-dimensional object 2100 may be formed of cyan print material and yellow print material and cured by a cure lamp. In another example, lower color graphic layer 2102 may be formed using print material from multiple cartridges. In another example, lower color graphic layer 2102 may be formed by intermixing print material above and/or directly onto the structural layer. In yet another example, lower color graphic layer 2102 may have regions having different compositions of print material. In another example, lower color graphic layer 2102 may be formed using any suitable number of sublayers and/or passes of a cure lamp. In other embodiments, the lower color graphic layer used in a three-dimensional object having an intermediate color graphic layer may be different.

In some embodiments, the upper color graphic layer used in a three-dimensional object having an intermediate color graphic layer may have one or more features of upper color graphic layer 1208 illustrated in FIG. 12. Referring to FIG. 21, upper color graphic layer 2110 may be formed of cyan print material and yellow print material and cured by a cure lamp. In another example, upper color graphic layer 2110 may be formed using print material from multiple cartridges. In another example, upper color graphic layer 2110 may be formed by intermixing print material above and/or directly onto the structural layer. In yet another example, upper color graphic layer 2110 may have regions having different compositions of print material. In another example, upper color graphic layer 2110 may be formed using any suitable number of sublayers and/or passes of a cure lamp. In other embodiments, the upper color graphic layer used in a three-dimensional object having an intermediate color graphic layer may be different.

Some embodiments can include provisions that permit protection from erosion and/or abrasion of a three-dimensional object having an intermediate color graphic layer. In some cases, the protection from erosion and/or abrasion may be permitted by use of an optional protective transparent layer. In other cases, the protection from erosion and/or abrasion may be permitted by using other techniques, materials, and/or methods.

In embodiments where a protective transparent layer is used to permit protection from erosion and/or abrasion of a three-dimensional object having an intermediate color graphic layer, any suitable materials and/or techniques may be used to form the protective transparent layer. In some embodiments, the protective transparent layer formed in a three-dimensional object having an intermediate color graphic layer may be similar to the protective transparent layer formed in a three-dimensional object omitting the intermediate color graphic layer (see FIG. 15). For example, the protective transparent layer may be formed using CMYK printing techniques. In another example, the protective transparent layer may have any suitable thickness. Referring to FIG. 21, protective transparent layer 2112 may be formed of clear print material. In other embodiments, the protective transparent layer formed in a three-dimensional object having an intermediate color graphic layer may be different from the protective transparent layer formed in a three-dimensional object omitting the intermediate color graphic layer.

Some embodiments permit printing a three-dimensional object having an intermediate color graphic layer onto a non-white substrate. In some cases, a white layer may be printed onto the non-white substrate to permit the three-dimensional object to have a consistent appearance. In other cases, the non-white substrate may be printed onto using other methods, techniques, and/or materials.

In embodiments where a white layer is used with an intermediate color graphic layer, the white layer may be formed using any suitable method, technique, and/or material to permit printing on the non-white substrate. Referring to FIG. 21, three-dimensional object 2100 may optionally include white layer 2114. In the example, white layer 2114 may be formed by dispensing white print material onto non-white substrate 2115 and by curing white print material after dispensing. In other embodiments, the white layer may be formed using other methods, techniques, and/or print materials.

Some embodiments permit printing a three-dimensional object having an intermediate color graphic layer onto a non-planar substrate. In some cases, a transparent base layer may be printed onto the non-planar substrate to permit the three-dimensional object to have a desired profile. It should be understood that the transparent base layer may be optionally formed onto any suitable substrate, for example, on a planar substrate (not shown). In other cases, the non-planar substrate may be printed onto using other methods, techniques, and/or materials.

In embodiments where a transparent base layer is used with an intermediate color graphic layer, the transparent base layer may be formed using any suitable method, technique, and/or material to permit printing on the non-planar substrate. For example, the transparent base layer may be formed using CMYK printing techniques as discussed above. Referring to FIG. 21, three-dimensional object 2100 may optionally include transparent base layer 2116. In the example, transparent base layer 2116 may be formed by dispensing clear print material onto non-planar substrate 2117 and by curing the clear print material after dispensing. In other embodiments, the transparent base layer may be formed using other methods, techniques, and/or print materials.

Some embodiments can include provisions that permit underlying layers to become visible to an observer after an abrasion of upper layers. In some embodiments, an opaque structural layer may separate color graphic layers to permit underlying layers to become visible to an observer after an abrasion of upper layers. In other embodiments, other provision may be used that permit underlying layers to become visible to an observer after an abrasion of upper layers.

In embodiments where an opaque structural layer is used to permit underlying layers to become visible to an observer after an abrasion of upper layers, the opaque structural layer may be formed using any suitable method, technique, and/or material. For example, the opaque structural layer may be formed using CMYK printing techniques as discussed above and/or using white print material as discussed above. In other embodiments, the opaque structural layer may be formed using other methods, techniques, and/or print materials.

Figure 22:
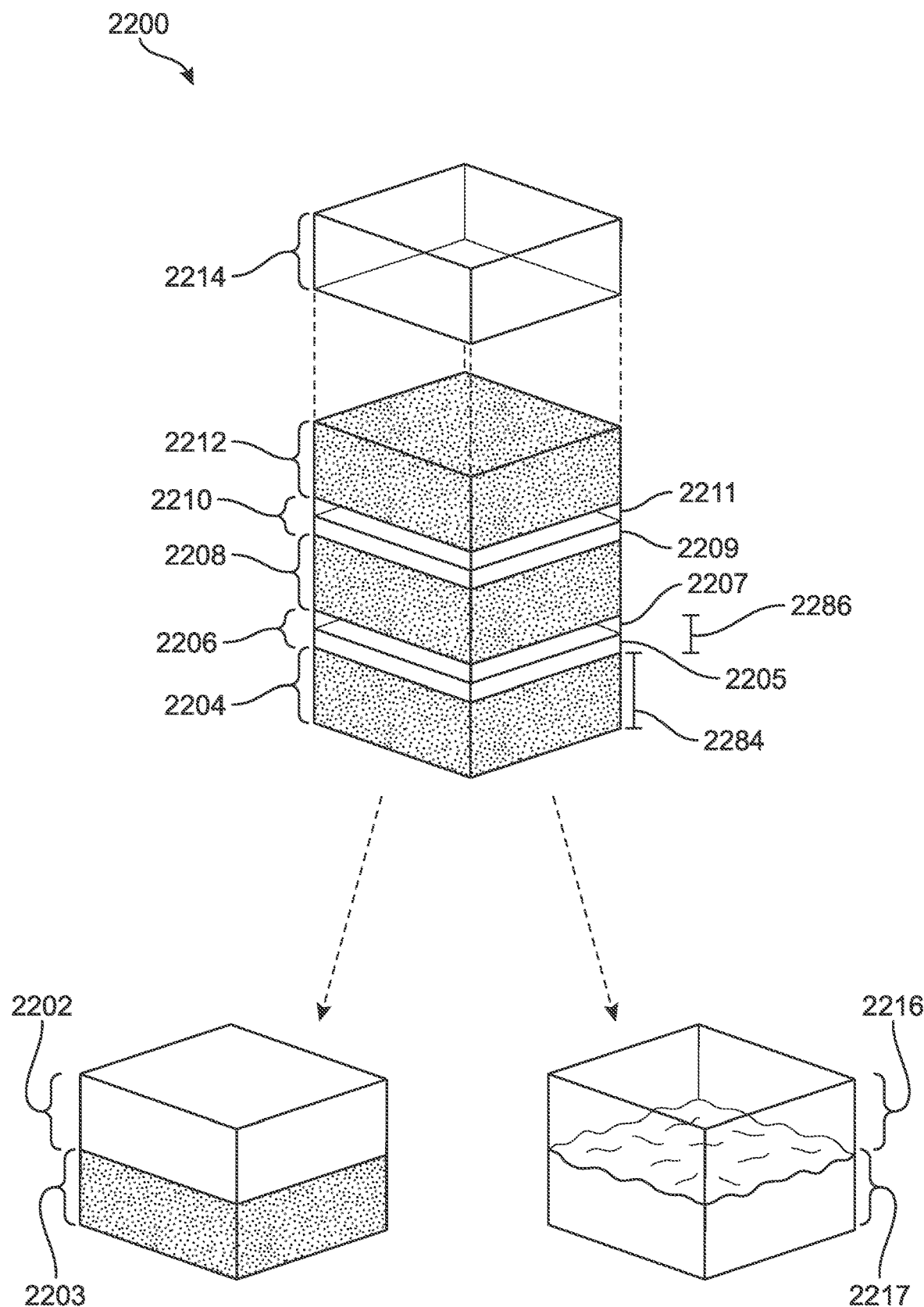
FIG. 22 shows an exemplary three-dimensional object including an upper color graphic layer, an intermediate color graphic layer, a lower color graphic layer, and opaque structural layers, in accordance with an exemplary embodiment.

Generally, the opaque structural layer may be formed using any suitable print material. In some embodiments, the opaque structural layer may be formed using white pigments. Referring to FIG. 22, one or more inner opaque structural layers 2206 (i.e., layer 2205 and layer 2207) may be formed onto lower color graphic layer 2204. In the example, the printing device may form one or more inner opaque structural layers 2206 by dispensing white print material and by curing white print material after dispensing. In other embodiments, the opaque structural layer may be formed using different pigments and/or print materials.

Generally, any suitable number of opaque structural layers may be used. Referring to FIG. 22, three-dimensional object 2200 may include one or more outer opaque structural layers 2210. In some embodiments, more than two opaque structural layers may be used. In other embodiments, a single opaque structural layer may be used.

In some embodiments, the opaque structural layers may be formed using similar methods, techniques, and/or materials. Referring to FIG. 22, one or more outer opaque structural layers 2210 (e.g., layer 2207 and layer 2209) may be formed onto intermediate color graphic layer 2208 using the method, technique, and/or material used to form one or more inner opaque structural layers 2206 onto lower color graphic layer 2204. In the example, the printing device may print one or more outer opaque structural layers 2210 by dispensing white print material and by curing the white print material after dispensing. In other embodiments, one or more of the opaque structural layers may be formed differently from the other opaque structural layers (not shown).

In embodiments where an opaque structural layer is used to print a three-dimensional object, the three-dimensional object may be formed of any suitable color graphic layers. In some embodiments, the three-dimensional object may include a lower color graphic layer, an intermediate color graphic layer, and an upper color graphic layer. In some embodiments, the three-dimensional object may include a lower color graphic layer, multiple intermediate color graphic layers, and an upper color graphic layer. In some embodiments, the three-dimensional object may include an upper color graphic layer and a lower color graphic layer. In other embodiments, a three-dimensional object having an opaque structural layer may be different.

In some embodiments, the lower color graphic layer used in a three-dimensional object having an opaque structural layer may have one or more features of lower color graphic layer 620 illustrated in FIG. 10. Referring to FIG. 22, lower color graphic layer 2204 of three-dimensional object 2200 may be formed of cyan print material and yellow print material and cured by a cure lamp. In another example, lower color graphic layer 2204 may be formed using print material from multiple cartridges. In another example, lower color graphic layer 2204 may be formed by intermixing print material above and/or directly onto the structural layer. In yet another example, lower color graphic layer 2204 may have regions having different compositions of print material. In another example, lower color graphic layer 2204 may be formed using any suitable number of sublayers and/or passes of a cure lamp. In other embodiments, the lower color graphic layer used in a three-dimensional object having an opaque structural layer may be different.

In some embodiments, the intermediate color graphic layer used in a three-dimensional object having an opaque structural layer may have one or more features of intermediate color graphic layer 2106 illustrated in FIG. 21. For example, referring to FIG. 22, intermediate color graphic layer 2208 of three-dimensional object 2200 may be formed of cyan print material and yellow print material and cured by a cure lamp. In another example, intermediate color graphic layer 2208 may be formed using print material from multiple cartridges. In another example, intermediate color graphic layer 2208 may be formed by intermixing print material above and/or directly onto the structural layer. In yet another example, intermediate color graphic layer 2208 may have regions having different compositions of print material. In another example, intermediate color graphic layer 2208 may be formed using any suitable number of sublayers and/or passes of a cure lamp. In other embodiments, the intermediate color graphic layer used in a three-dimensional object having an opaque structural layer may be different.

In some embodiments, the intermediate color graphic layer may be formed with a corresponding opaque structural layer. Referring to FIG. 22, three-dimensional object 2200 may include intermediate color graphic layer 2208 having a one or more corresponding outer opaque structural layers 2210. Although only one pair of an intermediate color graphic layer and a corresponding opaque structural layer is shown in FIG. 22, it should be understood that a three-dimensional object may include any suitable number of pairs of an intermediate color graphic layer and a corresponding opaque structural layer. In other embodiments, a corresponding opaque structural layer may be omitted.

In some embodiments, the upper color graphic layer used in a three-dimensional object having an opaque structural layer may have one or more features of upper color graphic layer 1208 illustrated in FIG. 12. Referring to FIG. 22, upper color graphic layer 2212 may be formed of cyan print material and yellow print material and cured by a cure lamp. In another example, upper color graphic layer 2212 may be formed using print material from multiple cartridges. In another example, upper color graphic layer 2212 may be formed by intermixing print material above and/or directly onto the structural layer. In yet another example, upper color graphic layer 2212 may have regions having different compositions of print material. In another example, upper color graphic layer 2212 may be formed using any suitable number of sublayers and/or passes of a cure lamp. In other embodiments, the upper color graphic layer used in a three-dimensional object having an opaque structural layer may be different.

In some embodiments, one or more opaque structural layers may separate the color graphic layers of a three-dimensional object. Referring to FIG. 22, one or more inner opaque structural layers 2206 (e.g., layer 2205 and layer 2207) separates lower color graphic layer 2204 and intermediate color graphic layer 2208. In the example, one or more outer opaque structural layers 2210 separates intermediate color graphic layer 2208 and upper color graphic layer 2212. In this arrangement, layers may be worn down to reveal an underlying color graphic layer. In other embodiments, the opaque structural layers may be positioned differently within the three-dimensional object.

Generally, the color graphic layers of a three-dimensional object having an opaque structural layer may be printed using any suitable techniques. In some embodiments, the color graphic layers may be printed using a single set of graphic information representing a portion of a color graphic. In such instances, the lower color graphic layer may be printed using the single set of graphic information, the intermediate color graphic layer may be printed using the single set of graphic information, and the upper graphic layer may be printed using the single set of graphic information. In other embodiments, the color graphic design information may include a first set of graphic information representing a first portion of a color graphic, a second set of graphic information representing a second portion of a color graphic, and a third set of graphic information representing an intermediate portion of the color graphic. In such instances, the lower color graphic layer may be printed using the first set of graphic information, the intermediate graphic layer may be printed using the third set of graphic information, and the upper graphic layer may be printed using the second set of graphic information.

In some embodiments, different sets of graphic information included in color graphic design information may be visually equivalent to each other. For example, the third set of graphic information may include a color that may be printed using 70 drops of cyan print material and 70 drops of yellow print material. In the example, the first set of graphic information may include a color that may be printed using 70 drops of cyan print material and 70 drops of yellow print material, and the second set of graphic information may include a color that may be printed using 70 drops of cyan print material and 70 drops of yellow print material. In other embodiments, different sets of graphic information may be visually different.

In some embodiments, different sets of graphic information included in color graphic design information may be visually equivalent or identical to the color graphic. For example, the third set of graphic information may include a color that may be printed using 70 drops of cyan print material and 70 drops of yellow print material. In the example, the second set of graphic information may include a color that may be printed using 70 drops of cyan print material and 70 drops of yellow print material. In the example, the first set of graphic information may include a color that may be printed using 70 drops of cyan print material and 70 drops of yellow print material. In the example, each of the first set of graphic information, the second set of graphic information, and the third set of graphic information may be visually equivalent to the color graphic. In other embodiments, different sets of graphic information included in color graphic design information may be visually different to the color graphic.

In some embodiments, the intermediate color graphic layer, the upper color graphic layer, and the lower color graphic layer may have the same combination of pigments. Referring to FIG. 22, lower color graphic layer 2204 of three-dimensional object 2200 may be formed of cyan print material and yellow print material, intermediate color graphic layer 2208 may be formed of cyan print material and yellow print material, and upper color graphic layer 2212 may be formed of cyan print material and yellow print material. In the example, one or more inner opaque structural layers 2206 may be formed of white print material, and one or more outer opaque structural layers 2210 may be formed of white print material. In other embodiments, the color graphic layers of a three-dimensional object having an opaque structural layer may have different combinations of pigments.

In some embodiments, the opaque structural layer may have a thickness less than a thickness of the color graphic layers. Referring to FIG. 22, one or more inner opaque structural layers 2206 may have thickness 2286 that is less than thickness 2284 of lower color graphic layer 2204. In other embodiments, the opaque structural layer may have a thickness greater than or equal to the color graphic layers.

In embodiments where an opaque structural layer is used, a protective transparent layer may be provided to facilitate an improved abrasion resistance. Referring to FIG. 22, three-dimensional object 2200 may optionally include protective transparent layer 2214. In those instances where a protective transparent layer is included, the protective transparent layer may be substantially similar to a protective transparent layer used for three-dimensional objects using transparent structural layers. For example, protective transparent layer 2214 of FIG. 22 may be formed of clear print material and may be substantially similar to protective transparent layer 1508 of FIG. 15 and/or protective transparent layer 2112 of FIG. 21. In other embodiments, the protective transparent layer may be formed differently.

In some embodiments, a three-dimensional object having an opaque structural layer may be printed with a white layer to permit printing onto a non-white substrate. Referring to FIG. 22, three-dimensional object 2200 may optionally include white layer 2202. In those instances where white layer 2202 is used, white layer 2202 may be substantially similar to a white layer used for three-dimensional objects using a transparent structural layer. For example, white layer 2202 of FIG. 22 may be substantially similar to white layer 1702 of FIG. 17 and/or white layer 2114 of FIG. 21. In the example, white layer 2202 may be formed by dispensing white print material onto non-white substrate 2203 and by curing white print material after dispensing. In other embodiments, the white layer may be omitted.

Some embodiments permit printing a three-dimensional object having an opaque structural layer onto a non-planar substrate. In some cases, a transparent base layer may be printed onto the non-planar substrate to permit the three-dimensional object to have a desired profile. It should be understood that the transparent base layer may be optionally formed onto any suitable substrate, for example, on a planar substrate (not shown). In other cases, the non-planar substrate may be printed onto using other methods, techniques, and/or materials.

In embodiments where a transparent base layer is used with an opaque structural layer, the transparent base layer may be formed using any suitable method, technique, and/or material to permit printing on the non-planar substrate. For example, the transparent base layer may be formed using CMYK printing techniques as discussed above. Referring to FIG. 22, three-dimensional object 2200 may optionally include transparent base layer 2116. In the example, transparent base layer 2216 may be formed by dispensing clear print material onto non-planar substrate 2217 and by curing the clear print material after dispensing. In other embodiments, the transparent base layer may be formed using other methods, techniques, and/or print materials.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substitute for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A three-dimensional object printed onto an article, the three-dimensional object comprising:
   a lower color graphic layer printed onto an article;
   one or more transparent structural layers printed onto the lower color graphic layer; and
   an upper color graphic layer printed onto an uppermost layer of the one or more transparent structural layers,
   wherein the upper color graphic layer and the lower color graphic layer collectively visually depict a color graphic image.

2. The three-dimensional object of claim 1, wherein the lower color graphic layer comprises one or more pigments different than one or more pigments of the upper color graphic layer.

3. The three-dimensional object of claim 1, further comprising a protective transparent layer printed onto the upper color graphic layer.

4. The three-dimensional object of claim 1, wherein a first portion of the lower color graphic layer has a different composition of print material than a second portion of the lower color graphic layer.

5. The three-dimensional object of claim 1, wherein the article is an article of footwear.

6. The three-dimensional object of claim 5, wherein lower color graphic layer is printed onto an upper of the article of footwear.

7. The three-dimensional object of claim 1, wherein the article is an article of apparel.

8. A three-dimensional object printed onto an article, the three-dimensional object comprising:

a white layer printed onto a non-white portion of an article;

a lower color graphic layer printed onto the white layer;

one or more transparent structural layers printed onto the lower color graphic layer; and an upper color graphic layer printed onto an uppermost layer of the one or more transparent structural layers, wherein the upper color graphic layer and the lower color graphic layer collectively visually depict a color graphic image.

9. The three-dimensional object of claim 8, wherein the lower color graphic layer comprises one or more pigments different than one or more pigments of the upper color graphic layer.

10. The three-dimensional object of claim 8, further comprising a protective transparent layer printed onto the upper color graphic layer.

11. The three-dimensional object of claim 8, wherein a first portion of the lower color graphic layer has a different composition of print material than a second portion of the lower color graphic layer.

12. The three-dimensional object of claim 8, wherein the article is an article of footwear.

13. The three-dimensional object of claim 12, wherein lower color graphic layer is printed onto an upper of the article of footwear.

14. The three-dimensional object of claim 8, wherein the article is an article of apparel.

15. A three-dimensional object printed onto an article, the three-dimensional object comprising:

a plurality of transparent structural layers printed onto an article; and a color layer printed onto an uppermost layer of the plurality of transparent structural layers.

16. The three-dimensional object of claim 15, wherein the color layer is a second color layer, wherein the three-dimensional object further comprises a first color layer, and wherein a lowermost layer of the plurality of transparent structural layers is printed onto the first color layer.

17. The three-dimensional object of claim 16, wherein the first color layer and the second color layer collectively visually depict a color graphic image.

18. The three-dimensional object of claim 15, wherein the article is an article of footwear.

19. The three-dimensional object of claim 15, wherein the article is an article of apparel.

20. A three-dimensional object printed onto an article, the three-dimensional object comprising:

a lower color graphic layer printed onto an article;

one or more inner transparent structural layers printed onto the lower color graphic layer;

an intermediate color graphic layer printed onto an uppermost layer of the one or more inner transparent structural layers;

one or more outer transparent structural layers printed onto the intermediate color graphic layer; and an upper color graphic layer printed onto an uppermost layer of the one or more outer transparent structural layers, wherein the upper color graphic layer, the intermediate color graphic layer, and the lower color graphic layer collectively visually depict a color graphic image.

21. The three-dimensional object of claim 20, wherein the lower color graphic layer comprises one or more pigments different than one or more pigments of the intermediate color graphic layer, and wherein the lower color graphic layer comprises one or more pigments different than one or more pigments of the upper color graphic layer.

22. The three-dimensional object of claim 20, further comprising a protective transparent layer printed onto the upper color graphic layer.

23. The three-dimensional object of claim 20, wherein the article is an article of footwear.

24. The three-dimensional object of claim 20, wherein the article is an article of apparel.

* * * * *